(12) United States Patent
Koyama

(10) Patent No.: US 9,802,801 B2
(45) Date of Patent: Oct. 31, 2017

(54) STACKER CRANE

(71) Applicant: MURATA MACHINERY, LTD., Kyoto-shi, Kyoto (JP)

(72) Inventor: Yoichiro Koyama, Inumaya (JP)

(73) Assignee: MURATA MACHINERY, LTD., Kyoto (JP)

( * ) Notice: Subject to any disclaimer, the term of this patent is extended or adjusted under 35 U.S.C. 154(b) by 357 days.

(21) Appl. No.: 14/424,132

(22) PCT Filed: Aug. 22, 2013

(86) PCT No.: PCT/JP2013/072375
§ 371 (c)(1),
(2) Date: Feb. 26, 2015

(87) PCT Pub. No.: WO2014/038386
PCT Pub. Date: Mar. 13, 2014

(65) Prior Publication Data
US 2015/0210519 A1 Jul. 30, 2015

(30) Foreign Application Priority Data

Sep. 5, 2012 (JP) .................... 2012-194772

(51) Int. Cl.
*B66F 9/07* (2006.01)
*B65G 1/04* (2006.01)

(52) U.S. Cl.
CPC .............. *B66F 9/07* (2013.01); *B65G 1/0407* (2013.01); *B66F 9/072* (2013.01)

(58) Field of Classification Search
CPC ......... B66G 9/07; B66G 9/072; B65G 1/0407
See application file for complete search history.

(56) References Cited

U.S. PATENT DOCUMENTS

| 5,564,528 | A | * | 10/1996 | Goto | ............... | B66F 9/072 |
| | | | | | | 187/261 |
| 7,721,654 | B2 | * | 5/2010 | Ueda | ............... | B66F 9/072 |
| | | | | | | 104/106 |

(Continued)

FOREIGN PATENT DOCUMENTS

| AT | WO 2010118445 A1 * | 10/2010 | ............... B66F 9/07 |
| EP | 1 897 837 A2 | 3/2008 | |

(Continued)

OTHER PUBLICATIONS

Official Communication issued in International Patent Application No. PCT/JP2013/072375, dated Nov. 26, 2013.

(Continued)

*Primary Examiner* — Zachary L Kuhfuss
(74) *Attorney, Agent, or Firm* — Keating & Bennett, LLP

(57) ABSTRACT

First and second masts of a stacker crane are provided in a travelling vehicle main body to be spaced away from each other in an X-direction and extending in a Z-direction. First and second travel wheels are mounted to the travelling vehicle main body to be spaced away from each other in the X-direction, and roll on an upper surface of a lower guide rail. First and second drive wheel units are provided in the travelling vehicle main body to be spaced away from each other in the X direction. Each of the first and second drive wheel units includes a first drive wheel and a second drive wheel. The first drive wheel is in contact with a first side surface of the lower guide rail, and the second drive wheel is pivotably attached to the travelling vehicle main body and urged toward the first drive wheel so that the second drive wheel is in contact with a second surface of the lower guide rail.

9 Claims, 19 Drawing Sheets

(56) References Cited

U.S. PATENT DOCUMENTS

| | | | |
|---|---|---|---|
| 9,586,757 B2* | 3/2017 | Kainuma | B65G 1/0407 |
| 2004/0216957 A1 | 11/2004 | Hansl et al. | |
| 2006/0060106 A1* | 3/2006 | Ueda | B66F 9/072 |
| | | | 105/144 |
| 2006/0102433 A1* | 5/2006 | Ueda | B66F 9/072 |
| | | | 187/238 |
| 2010/0322752 A1* | 12/2010 | Ueda | B66F 9/08 |
| | | | 414/659 |
| 2012/0168255 A1* | 7/2012 | Iwata | B65G 1/0407 |
| | | | 187/244 |
| 2015/0158670 A1* | 6/2015 | Kainuma | B65G 1/0407 |
| | | | 414/277 |
| 2015/0225216 A1* | 8/2015 | Koyama | B66F 9/07 |
| | | | 187/244 |
| 2015/0225217 A1* | 8/2015 | Koyama | B66F 9/072 |
| | | | 187/244 |
| 2015/0225220 A1* | 8/2015 | Koyama | B66F 9/07 |
| | | | 187/266 |

FOREIGN PATENT DOCUMENTS

| | | |
|---|---|---|
| EP | 1 897 837 A3 | 3/2008 |
| JP | 08-258706 A | 10/1996 |
| JP | 2004-034913 A | 2/2004 |

OTHER PUBLICATIONS

English translation of Official Communication issued in corresponding International Application PCT/JP2013/072375, dated Mar. 5, 2015.

* cited by examiner

STACKER CRANE

BACKGROUND OF THE INVENTION

1. Field of the Invention

The present invention relates to a stacker crane.

2. Description of the Related Art

A conventional automated warehouse includes, for example, a pair of racks, a stacker crane, a warehousing station, and a delivery station. The pair of racks is spaced apart by a prescribed spacing in the forward-rearward direction. The stacker crane is provided moveably in the left-right direction between the front and rear racks. The warehousing station is disposed on a side of one of the racks. The delivery station is disposed on a side of the other one of the racks. The racks have numerous article storage shelves at the top, bottom, left, and right.

The stacker crane includes a travelling truck, a lift platform that is freely elevatable along a mast provided to the travelling truck, and an article transfer apparatus (e.g., a slide fork that is slidably provided in the forward-rearward direction) that is provided to the lift platform.

The travelling truck includes drive wheels and a travelling motor. The drive wheels are located on front and rear potions in a travelling direction of the stacker crane, and the travelling motor is located above the drive wheels (e.g., refer to Japanese Unexamined Patent Application Publication No. 2008-63067).

In recent years, there has been a demand to achieve high performance in stacker cranes (high speed performance and high acceleration-deceleration performance of the crane). Furthermore, achieving such performance also increases the possibility of wheel slippage, therefore it becomes necessary to pressurize the wheels. However, it becomes difficult to set the pressurizing force due to the variations in wheel pressure if the system uses the drive wheels which support the weight of the whole stacker crane.

SUMMARY OF THE INVENTION

Preferred embodiments of the present invention facilitate setting of a pressurizing force against drive wheels of a stacker crane and control of other matters.

A plurality of aspects of various preferred embodiments of the present invention will be described below. These aspects are capable of being arbitrarily combined as necessary or desired.

A stacker crane for travelling along a rail according to an aspect of various preferred embodiments of the present invention includes a lower travelling vehicle main body, a first mast and a second mast, a first travelling wheel and a second travelling wheel, and a first drive wheel unit and a second drive wheel unit.

The first mast and the second mast extend in a vertical direction. The first mast and the second mast are provided in the lower travelling vehicle main body such that the first mast and the second mast are spaced away from each other in a travelling direction.

The first travelling wheel and the second travelling wheel are configured to roll on a top surface of the rail. The first travelling wheel and the second travelling wheel are provided in the travelling vehicle main body such that the first travelling wheel and the second travelling wheel are spaced away from each other in the travelling direction.

The first drive wheel unit and the second drive wheel unit are provided in the lower travelling vehicle main body such that the first drive wheel unit and the second drive wheel unit are spaced away from each other in the travelling direction.

Each of the first drive wheel unit and the second drive wheel unit includes a first drive wheel and a second drive wheel.

The first drive wheel is configured to make contact with a first side surface of the rail.

The second drive wheel is attached to the lower travelling vehicle main body such that the second drive wheel is pivotable and the second drive wheel is urged toward the first drive wheel, thus making contact with a second side surface of the rail.

In this stacker crane, the first drive wheel and the second drive wheel clamp the side surfaces of the rail. The travelling vehicle main body travels in this state, and therefore variations in wheel pressure tends not to occur In addition, the impact of wheel pressure fluctuation is small, and therefore the pressurizing force that acts on the second drive wheel is able to be set to a proper value that is not excessively large. As a result, the size of the drive wheels is reduced or the lifespan of the drive wheels is extended.

The first travelling wheel and the second travelling wheel preferably are respectively located outward of the first mast and the second mast in the travelling direction. Here, "outward in the travelling direction" means "on the sides spaced apart from one another in the travelling direction." Accordingly, the first travelling wheel is disposed on the side opposite the second mast with respect to the first mast, and the second travelling wheel is disposed on the side opposite the first mast with respect to the second mast.

The first drive wheel unit and the second drive wheel unit preferably are respectively located outward of the first travelling wheel and the second travelling wheel in the travelling direction. Here, "outward in the travelling direction" means "on the sides spaced apart from one another in the travelling direction." Accordingly, the first drive wheel unit is disposed on the side opposite the second travelling wheel with respect to the first travelling wheel, and the second drive wheel unit is disposed on the side opposite the first travelling wheel with respect to the second travelling wheel.

In this stacker crane, the load imparted by the first mast and the second mast is supported by the travelling vehicle main body, the first travelling wheel unit, and the second travelling wheel unit, and therefore, the first drive wheel and the second drive wheel tend not to be affected by wheel pressure fluctuations.

A second drive wheel of the first drive wheel unit and a second drive wheel of the second drive wheel unit preferably are located on the same side of the rail in a crossing direction crossing the travelling direction.

In this stacker crane, the second drive wheels are preferably disposed on the same side of the rail. Accordingly, the stacker crane travels stably and rectilinearly.

In the stacker crane according to various preferred embodiments of the present invention, it becomes easier to set the pressurizing force of the drive wheel and to control other matters.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A stacker crane 1 is an article transfer apparatus that preferably travels inside an automated warehouse (not shown), for example. Below, the travelling direction of the stacker crane 1 is the X direction, and the width direction of the stacker crane 1 is the Y direction (crossing direction that cross the travelling direction). In addition, the vertical direction is the Z direction.

A pair of racks (not shown) is disposed on both sides of the stacker crane 1, one on each side, in the width direction (Y direction). The pair of racks is disposed to sandwich a travel passageway of the stacker crane 1. The pair of racks include a plurality of article storage shelves (not shown), and articles are loaded on the shelves. A warehousing station (not shown) configured to warehouse the articles is disposed at a lowermost tier of one of the racks, and a delivery station (not shown) configured to deliver the articles is disposed at a lowermost tier of the other rack.

Figure 1:
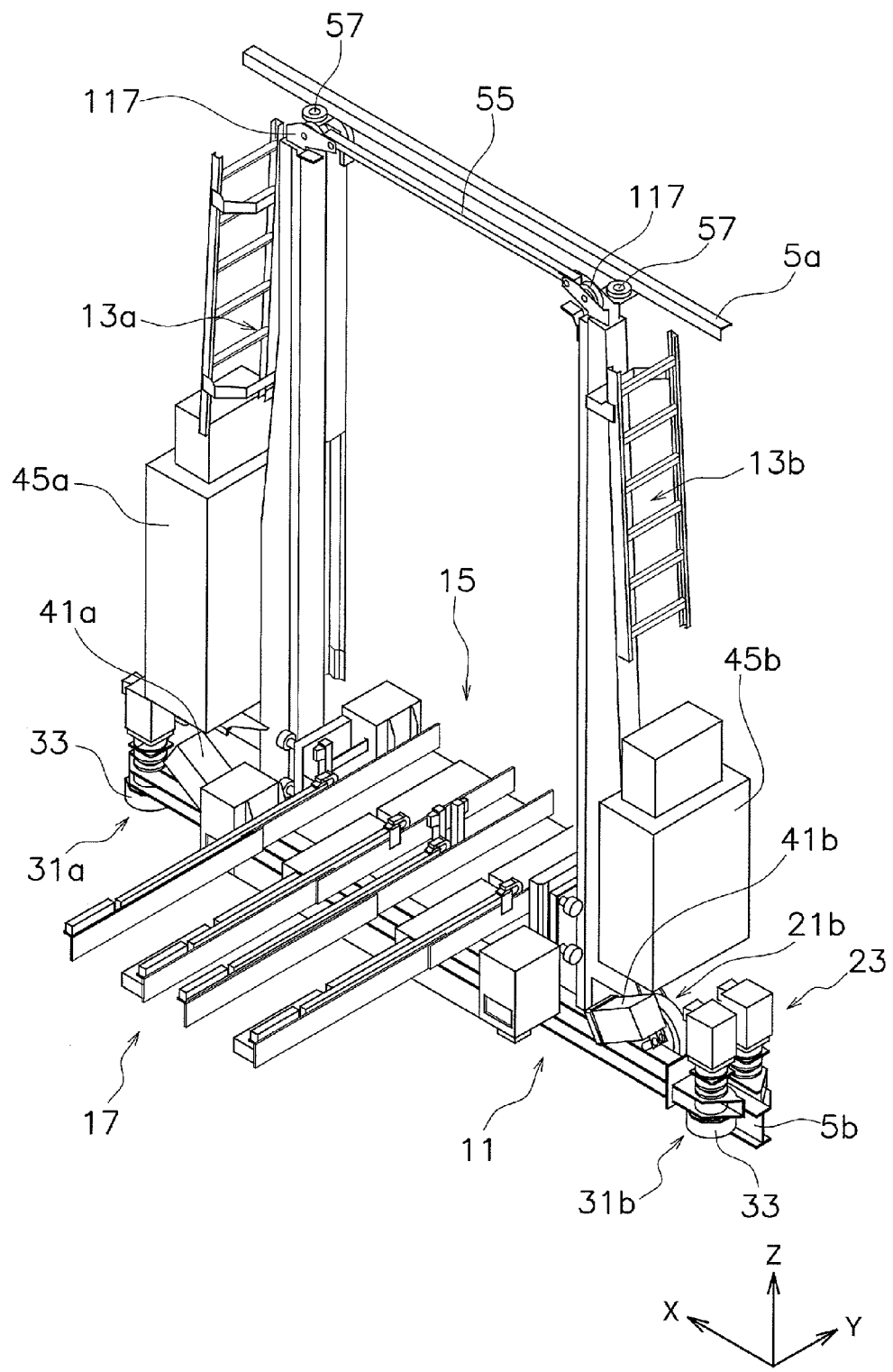
FIG. 1 is an oblique view of a stacker crane.
Figure 2:
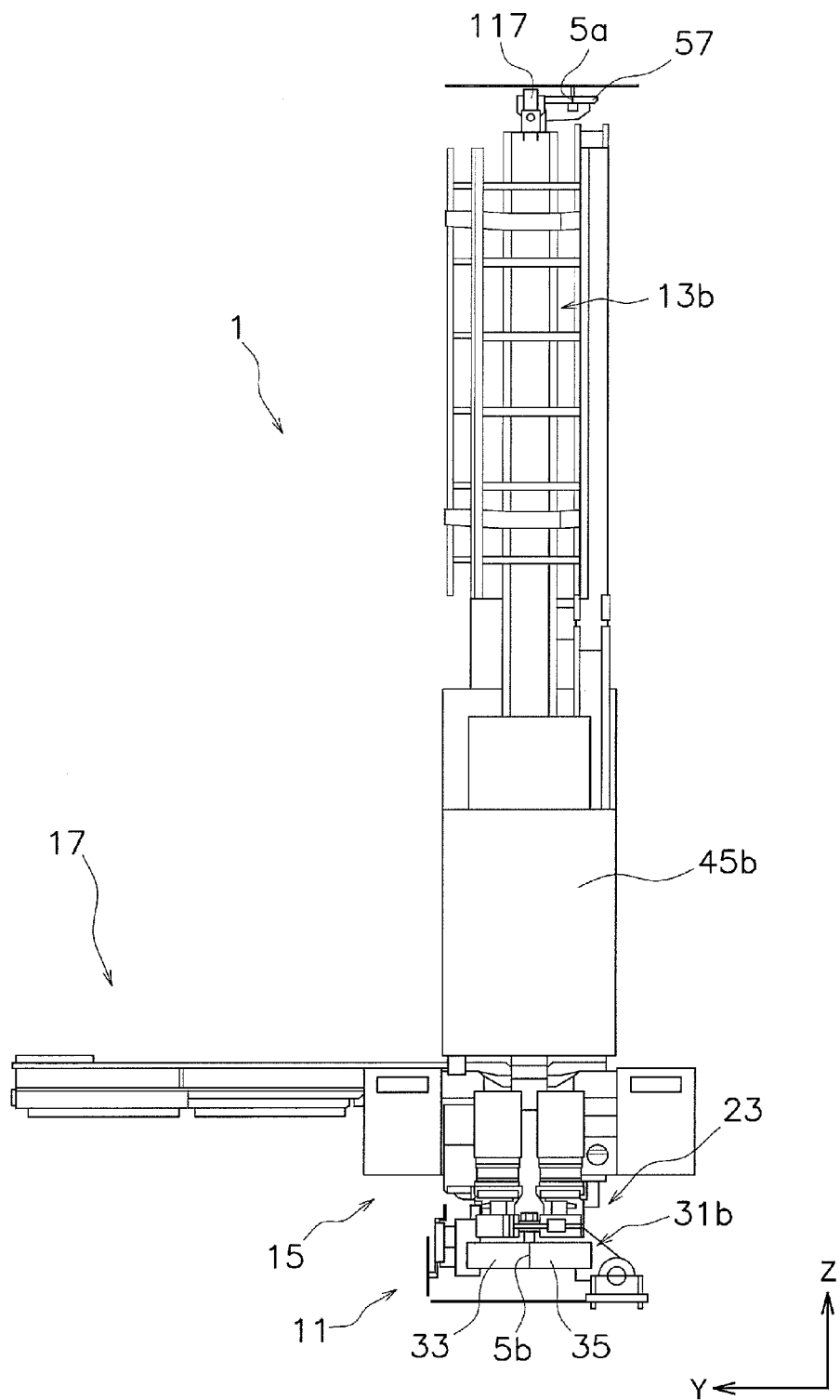
FIG. 2 is a side view of the stacker crane.

As shown in FIG. 1 and FIG. 2, an upper guide rail 5a and a lower guide rail 5b, which extend in the X direction along the travel passageway, are provided inside the automated warehouse. The upper guide rail 5a preferably is a plate-shaped member that extends perpendicularly or substantially perpendicularly downward. As shown in FIG. 4, FIG. 10, FIG. 11, and FIG. 12, the lower guide rail 5b preferably is I-shaped in a crossing section and includes an erect portion 5c and a horizontal portion 5d. In greater detail, an upper portion of the lower guide rail 5b preferably is T-shaped. The stacker crane 1 is guided moveably along the upper guide rail 5a and the lower guide rail 5b. The stacker crane 1 is configured to convey articles to and from the plurality of shelves, the warehousing station, and the delivery station.

Figure 3:
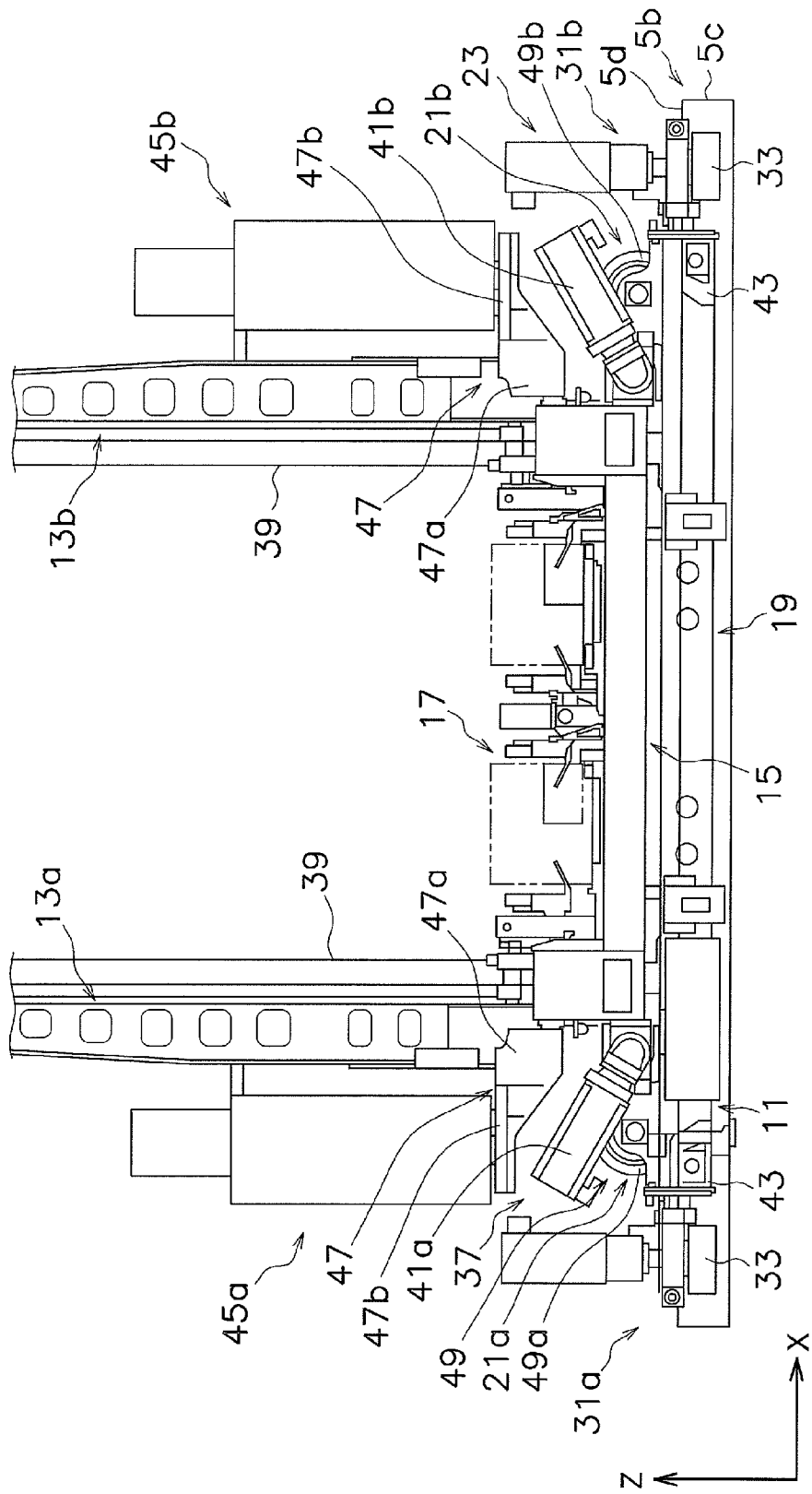
FIG. 3 is a front view of a lower of the stacker crane.

As shown in FIG. 1, FIG. 2, and FIG. 3, the stacker crane 1 includes a travelling vehicle 11, a first mast 13a, a second mast 13b, and a lift platform 15.

The first mast 13a and the second mast 13b are members configured to raise and lower the lift platform 15. The first mast 13a and the second mast 13b are spaced apart in the X direction. More specifically, the first mast 13a and the second mast 13b are disposed such that they sandwich the lift platform 15 in the X direction. The first mast 13a and the second mast 13b extend in the Z direction.

The travelling vehicle 11 is configured to move the first mast 13a, the second mast 13b, and the lift platform 15. The travelling vehicle 11 includes a travelling vehicle main body 19, a first travelling wheel unit 21a, a second travelling wheel unit 21b, and a travelling drive mechanism 23.

The travelling vehicle main body 19 defines a portion of the travelling vehicle 11. As shown in FIG. 5, FIG. 6, FIG. 7, and FIG. 8, the travelling vehicle main body 19 includes a first lower frame 25a and a second lower frame 25b. The first lower frame 25a and the second lower frame 25b are arrayed in the Y direction and extend in the X direction.

The first lower frame 25a and the second lower frame 25b preferably have line symmetry and have the same structure. The first lower frame 25a includes a first lower hollow frame 27a and two connecting plates 29 (discussed later). The second lower frame 25b includes a second lower hollow frame 27b and two more of the connecting plates 29 (discussed later).

The first travelling wheel unit 21a and the second travelling wheel unit 21b are attached to the travelling vehicle main body 19 at positions spaced apart in the X direction.

Figure 4:
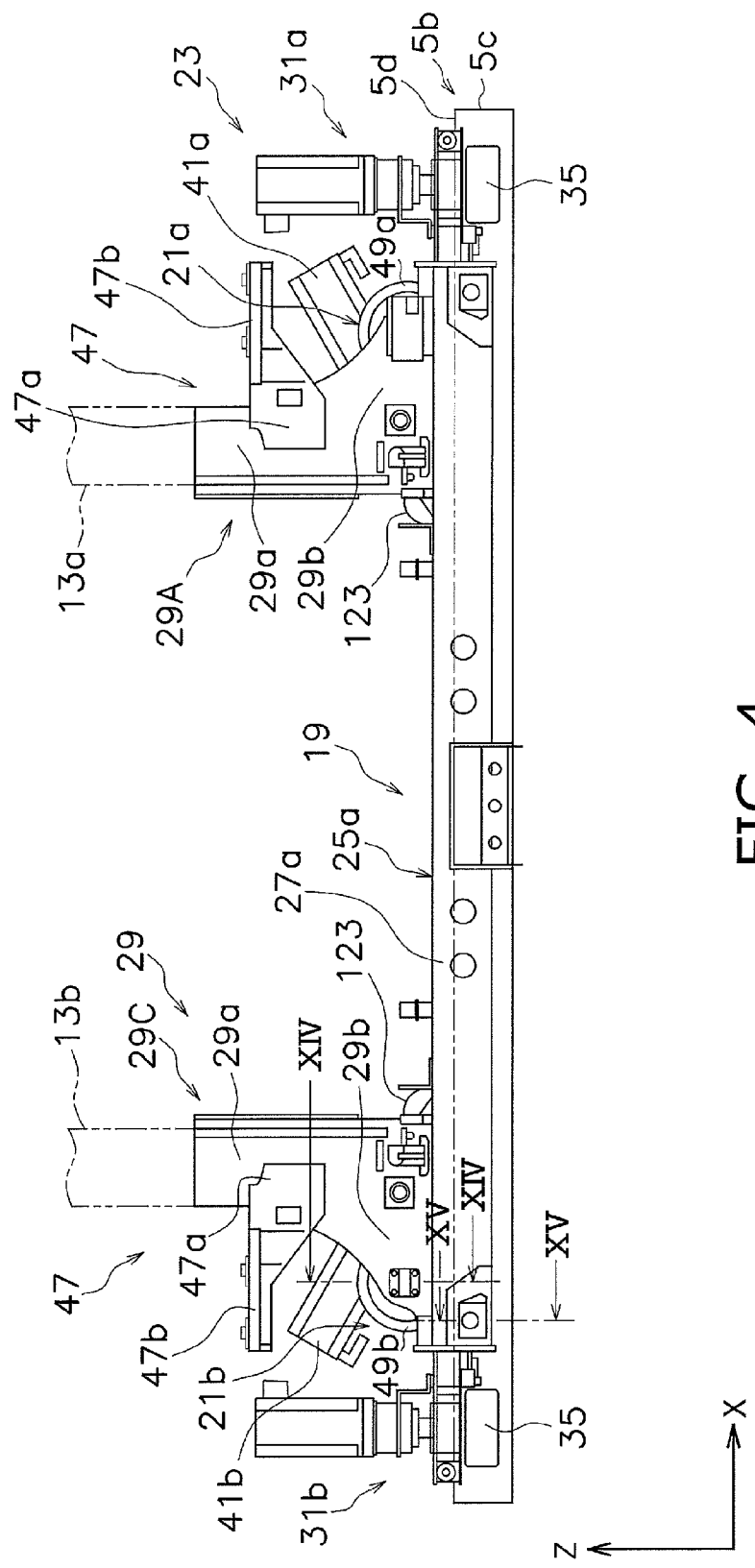
FIG. 4 is a front view of a travelling truck.
Figure 5:
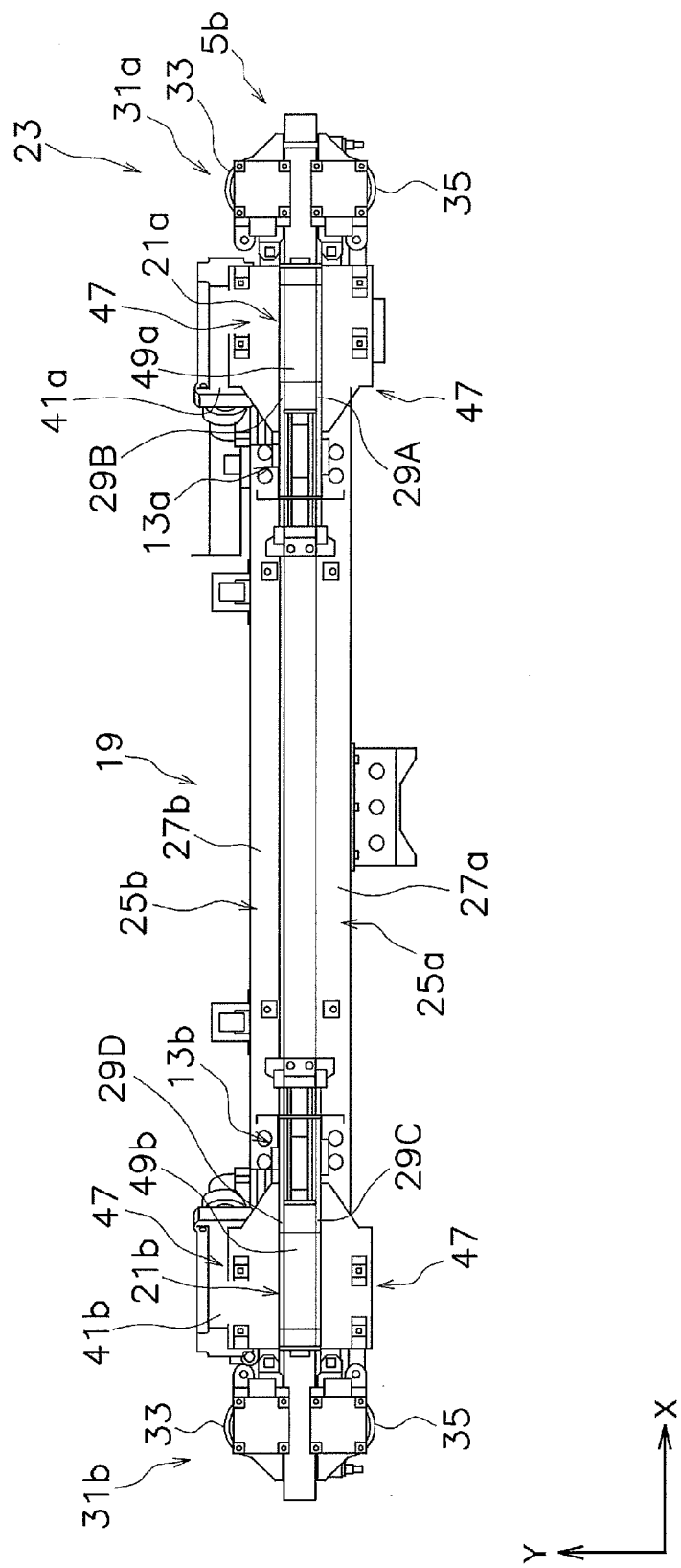
FIG. 5 is a plan view of the travelling truck.

The travelling drive mechanism 23 is configured to generate motive power to drive the travelling vehicle main body 19. As shown in FIG. 1, FIG. 4, and FIG. 5, the travelling drive mechanism 23 preferably includes a first drive wheel unit 31a and a second drive wheel unit 31b. The first drive wheel unit 31a and the second drive wheel unit 31b are attached to the travelling vehicle main body 19 spaced apart in the X direction. More specifically, the first drive wheel unit 31a and the second drive wheel unit 31b are attached to both ends of the travelling vehicle main body 19 in the X direction. The first drive wheel unit 31a and the second drive wheel unit 31b each include a first drive wheel 33 and a second drive wheel 35. In this case, the first drive wheel 33 and the second drive wheel 35 of the first drive wheel unit 31a may be called a first driving wheel and a second driving wheel, and the first drive wheel 33 and the second drive wheel 35 of the second drive wheel unit 31b may be called a third driving wheel and a fourth driving wheel.

The arrangement of each of the above mechanisms makes it possible to dispose the drive wheels using spaces in the X direction of the travelling vehicle main body 19. Furthermore, increasing the number of the drive wheels makes it possible to reduce the size of each of the drive wheels. As a result, maintenance of the drive wheels becomes easy.

As shown in FIG. 3, FIG. 4, and FIG. 5, the first travelling wheel unit 21a and the second travelling wheel unit 21b are respectively located outward of the first mast 13a and the second mast 13b in the X direction. Here, "outward in the X direction" means "on the sides spaced apart from one another in the X direction." Accordingly, specifically, the first travelling wheel unit 21a is disposed on the side opposite the second mast 13b with respect to the first mast 13a, and the second travelling wheel unit 21b is disposed on the side opposite the first mast 13a with respect to the second mast 13b. Furthermore, the first travelling wheel unit 21a and the second travelling wheel unit 21b are disposed slightly spaced apart from the first mast 13a and the second mast 13b, but they may be adjacent.

In addition, the first drive wheel unit 31a and the second drive wheel unit 31b are respectively located outward of the first travelling wheel unit 21a and the second travelling wheel unit 21b in the X direction. Here, "outward in the X direction" means "on the sides spaced apart from one another in the X direction." Accordingly, specifically, the first drive wheel unit 31a is disposed on the side opposite the second travelling wheel unit 21b with respect to the first travelling wheel unit 21a, and the second drive wheel unit 31b is disposed on the side opposite the first travelling wheel unit 21a with respect to the second travelling wheel unit 21b. Furthermore, the first drive wheel unit 31a and the second drive wheel unit 31b are slightly spaced apart from the first travelling wheel unit 21a and the second travelling wheel unit 21b, but they may be adjacent.

In the above case, the load imparted by the first mast 13a and the second mast 13b is supported by the travelling vehicle main body 19, the first travelling wheel unit 21a, and the second travelling wheel unit 21b, and therefore the first drive wheel unit 31a and the second drive wheel unit 31b tend not to be affected by wheel pressure fluctuations.

As shown in FIG. 1, the upper portions of the first mast 13a and the second mast 13b are linked together by a linking member 55 that extends in the X direction. In addition, as shown in FIG. 1, the first mast 13a and the second mast 13b are each provided with a roller mechanism 57 that is guided by the upper guide rail 5a.

The stacker crane 1 includes a lifting drive mechanism 37 (one example of a lifting apparatus) configured to raise and lower, and thus drive, the lift platform 15. The lifting drive mechanism 37 includes hanging belts 39, a first lifting drive motor 41a, and a second lifting drive motor 41b. The lift platform 15 is capable of moving in the Z direction along the first mast 13a and the second mast 13b. Specifically, the lift platform 15 is disposed between the first mast 13a and the second mast 13b in the X direction and is configured to be raised and lowered along the first mast 13a and the second mast 13b (discussed later). Furthermore, portions on both sides of the lift platform 15 are supported by the first mast 13a and the second mast 13b, respectively, so as to be liftable. The hanging belts 39 are attached to the lift platform 15. The first lifting drive motor 41a and the second lifting drive motor 41b are motors that drive the hanging belts 39 and are mounted to the first lower frame 25a and the second lower frame 25b in a tilted state. Specifically, upper ends of the first lifting drive motor 41a and the second lifting drive motor 41b are disposed on sides in the X direction with respect to lower ends of the first lifting drive motor 41a and the second lifting drive motor 41b.

The stacker crane 1 further includes a first controller 45a, a second controller 45b, and four support members 47. The first controller 45a and the second controller 45b are configured or programmed to control various operations of the stacker crane 1. The first controller 45a is supported by and fixed to the two support members 47 disposed on one side in the X direction. The second controller 45b is supported by and fixed to the two support members 47 disposed on the opposite side in the X direction. The support members 47 are fixed to the first lower frame 25a and the second lower frame 25b. The interior of the first controller 45a and the second controller 45b include electrical equipment, such as inverters, converters, and breakers, first travelling drive motors 81, second travelling drive motors 83, the first lifting drive motor 41a, and the second lifting drive motor 41b.

A transfer apparatus 17 is provided on the lift platform 15. The transfer apparatus 17 is configured to transfer articles between the stacker crane 1 and the shelves of the racks. The transfer apparatus 17 is capable of placing articles thereupon. Furthermore, the transfer apparatus 17 is configured to transfer articles from the stacker crane 1 to the shelves of the racks and to transfer articles from the shelves of the racks to the lift platform 15 of the stacker crane 1. The transfer apparatus 17 preferably includes a push-pull system that includes a telescoping arm. However, a slide fork system or some other system may be used as the transfer apparatus.

In the present preferred embodiment, the connecting plates 29 preferably are thin plate-shaped members. Furthermore, because other mechanisms are disposed between the pair of connecting plates 29 (between the pair of connecting plates 29 in the Y direction), the dimension of the travelling vehicle main body 19 in the Y direction is reduced, as shown in FIG. 5. For example, travelling wheels 49, the first mast 13a, the second mast 13b, and the lifting drive mechanism 37 are disposed between the pair of connecting plates 29.

The structure of the travelling vehicle main body 19 will be explained in greater detail.

Figure 8:
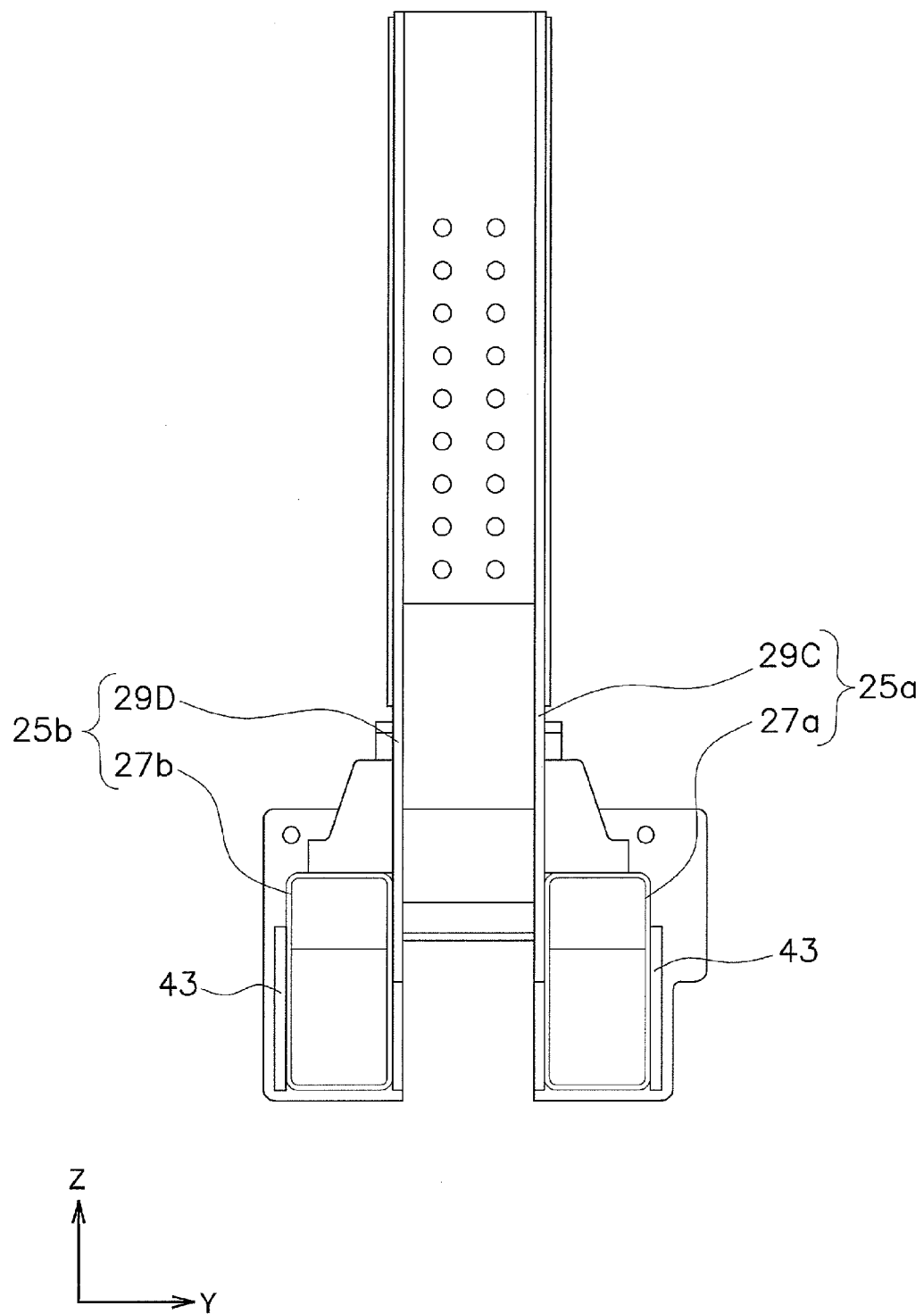
FIG. 8 is a side view of the lower frame.
Figure 14:
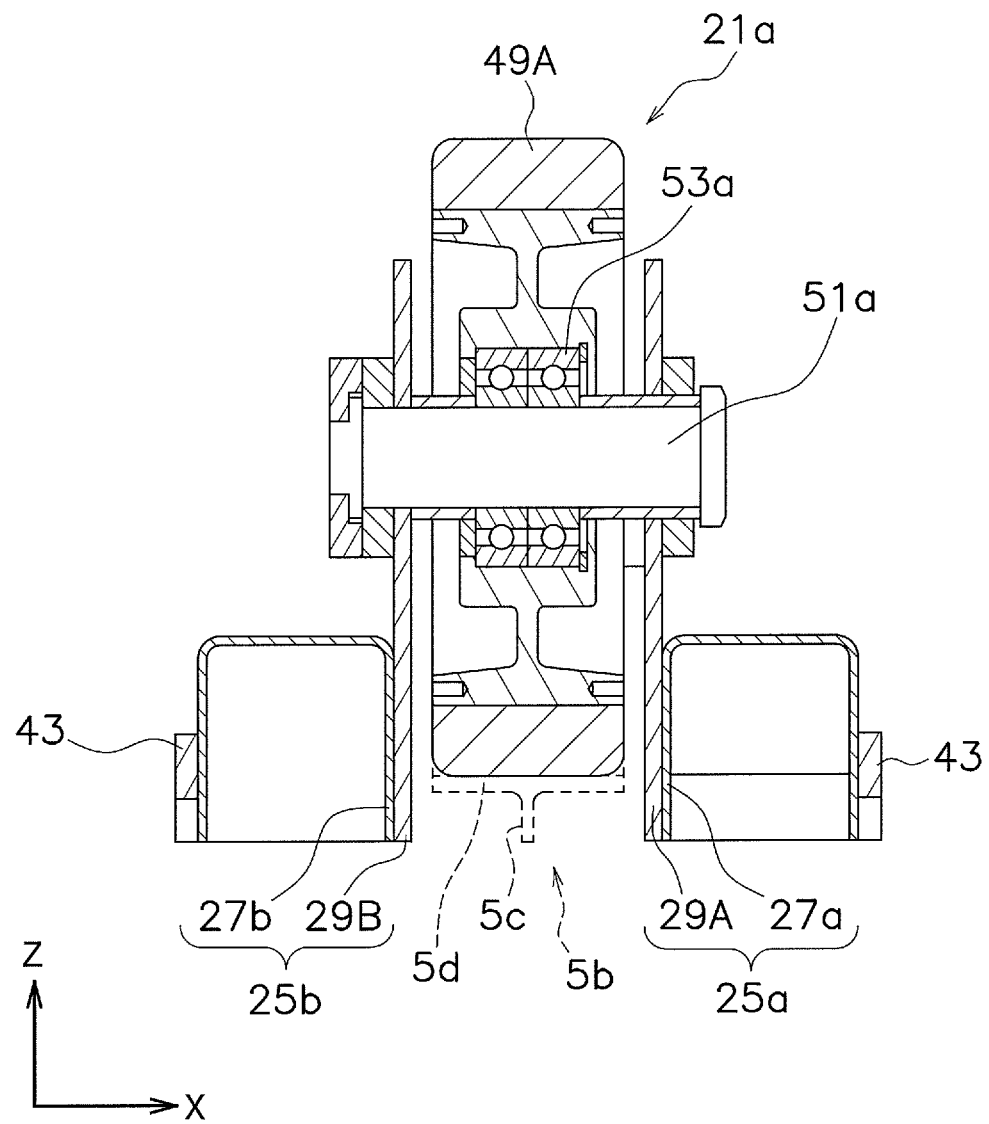
FIG. 14 is a cross sectional view taken along the line XIV-XIV in FIG. 4.

As shown in FIG. 8 and FIG. 14, the first lower hollow frame 27a and the second lower hollow frame 27b preferably include square pipes having rectangular cross sections, and the longitudinal direction thereof coincides with the X direction. As is clear from the drawings, the first lower hollow frame 27a and the second lower hollow frame 27b are longer in the Z direction than in the Y direction and include oblong cross sections. The first lower hollow frame 27a and the second lower hollow frame 27b are disposed on opposite sides of the lower guide rail 5b in the Y direction. More specifically, the first lower hollow frame 27a and the second lower hollow frame 27b are disposed sideward of the lower guide rail 5b (at positions that overlap when viewed in the Y direction). As a result, upper surface portions of the first lower hollow frame 27a and the second lower hollow frame 27b are disposed at positions that are higher than the horizontal portion 5d of the lower guide rail 5b. Furthermore, the first lower hollow frame 27a and the second lower hollow frame 27b are joined to one another via another member or mechanism.

The first lower hollow frame 27a and the second lower hollow frame 27b are disposed on both sides of the first mast 13a and the second mast 13b in the Y direction and are fixed to the first mast 13a and the second mast 13b via the connecting plates 29 (discussed later).

Figure 6:
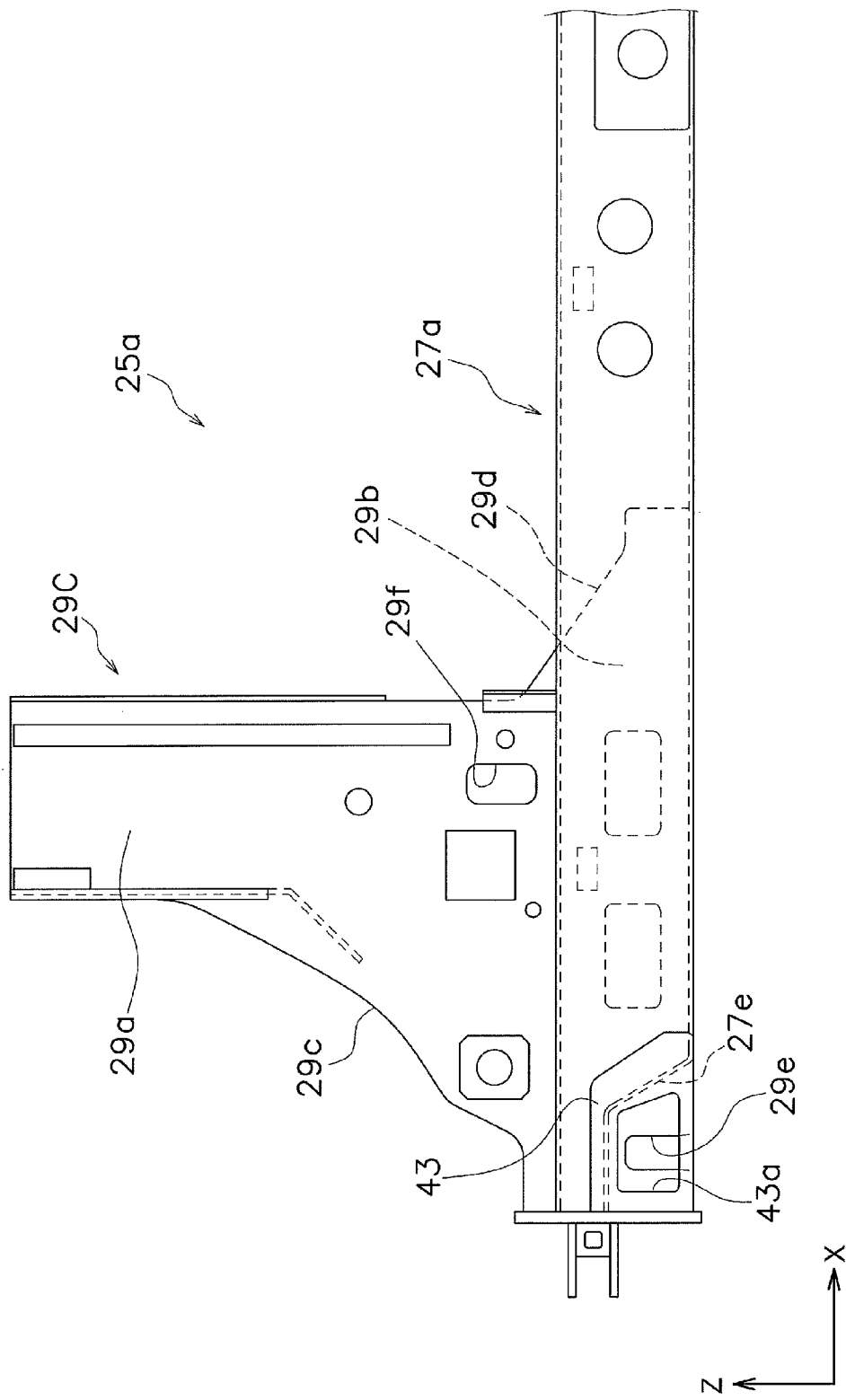
FIG. 6 is a partial front view of a lower frame.

Furthermore, as shown in FIG. 6, notches 27e are provided in lower portions of the first lower hollow frame 27a and the second lower hollow frame 27b at both ends in the X direction. Reinforcing plates 43 are fixed to side surfaces of the notches 27e in the Y direction. Openings 43a are provided in the reinforcing plates 43 at positions corresponding to the notches 27e.

Figure 7:
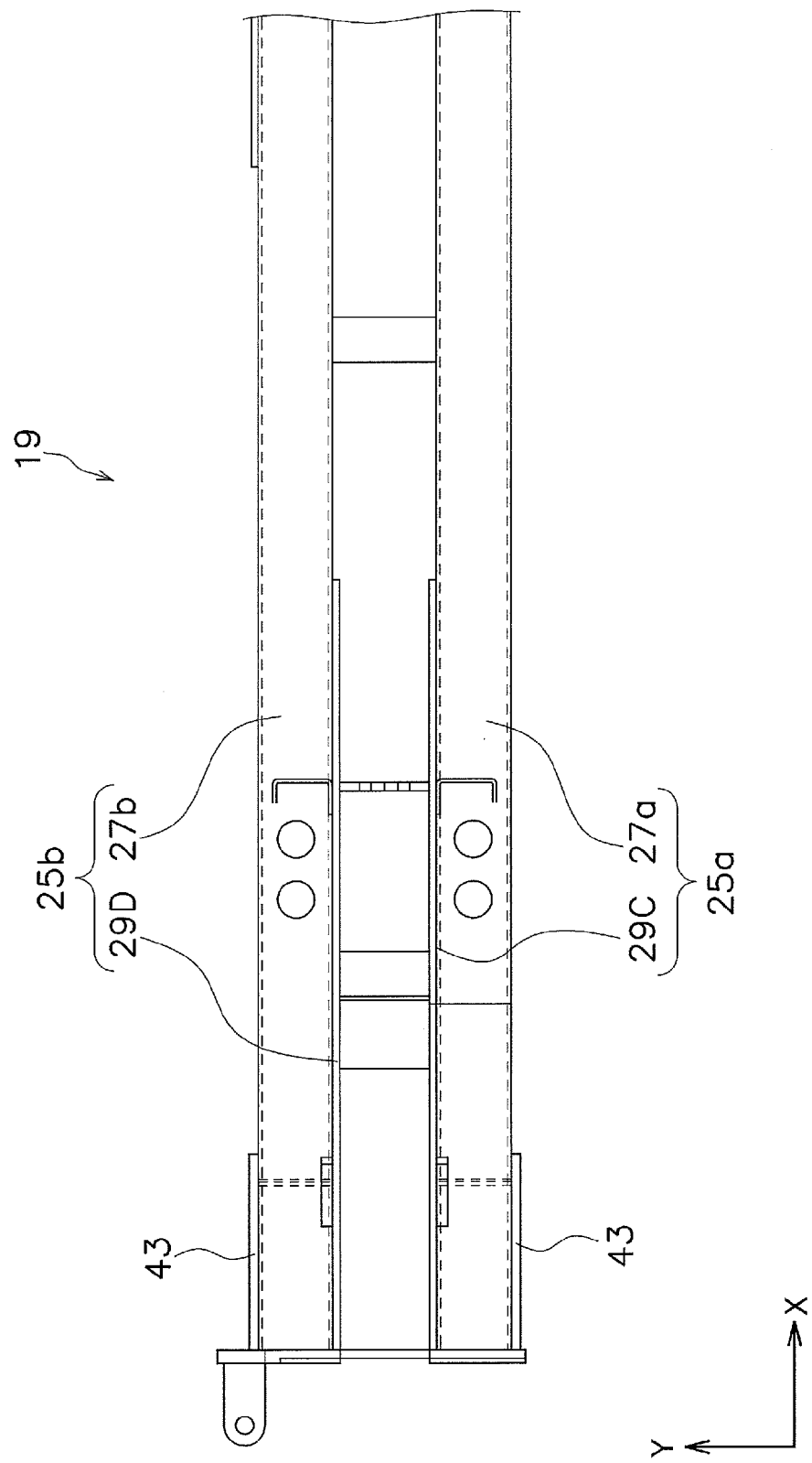
FIG. 7 is a partial plan view of the lower frame.

As shown in FIG. 7 and FIG. 8, the connecting plates 29 preferably are four thin plate-shaped members that are mounted to the lower portions and to both side surfaces facing the Y direction of the first mast 13a and the second mast 13b. The flat surfaces of the connecting plates 29 face the Y direction. As shown in FIG. 5, those mounted to the first mast 13a are a first plate 29A and a second plate 29B, and those mounted to the second mast 13b are a third plate 29C and a fourth plate 29D. The connecting plates 29 are fixed, by welding, to inner side surfaces of the first lower hollow frame 27a and the second lower hollow frame 27b in the Y direction. In other words, the first lower frame 25a includes the first lower hollow frame 27a and the two connecting plates 29 (the first plate 29A and the third plate 29C) that are fixed, by welding, to the inner sides thereof in the Y direction and at both ends thereof in the X direction. In addition, the second lower frame 25b includes the second lower hollow frame 27b and the two connecting plates 29 (the second plate 29B and the fourth plate 29D) that are fixed, by welding, to the inner sides thereof in the Y direction and at both ends thereof in the X direction.

To explain in further detail, the first mast 13a is fixed to inner side surfaces of the first plate 29A and the second plate 29B in the Y direction, and the first lower hollow frame 27a and the second lower hollow frame 27b are fixed to outer side surfaces of the first plate 29A and the second plate 29B, respectively, in the Y direction. The second mast 13b is fixed to inner side surfaces of the third plate 29C and the fourth plate 29D in the Y direction, and the first lower hollow frame 27a and the second lower hollow frame 27b are fixed to outer side surfaces of the third plate 29C and the fourth plate 29D, respectively, in the Y direction.

As explained above, the first mast 13a is fixed to the first lower hollow frame 27a and the second lower hollow frame 27b via the connecting plates 29 (the first plate 29A and the second plate 29B, respectively). In addition, the second mast 13b is fixed to the first lower hollow frame 27a and the second lower hollow frame 27b via the connecting plates 29 (the third plate 29C and the fourth plate 29D, respectively). In this case, because the thickness of the connecting plates 29 in the Y direction is small, the first mast 13a and the second mast 13b as well as the first lower hollow frame 27a and the second lower hollow frame 27b are proximate in the Y direction. Thereby, as shown in FIG. 5, FIG. 7, and FIG. 8, the entire structure is compact in the Y direction.

Figure 9:
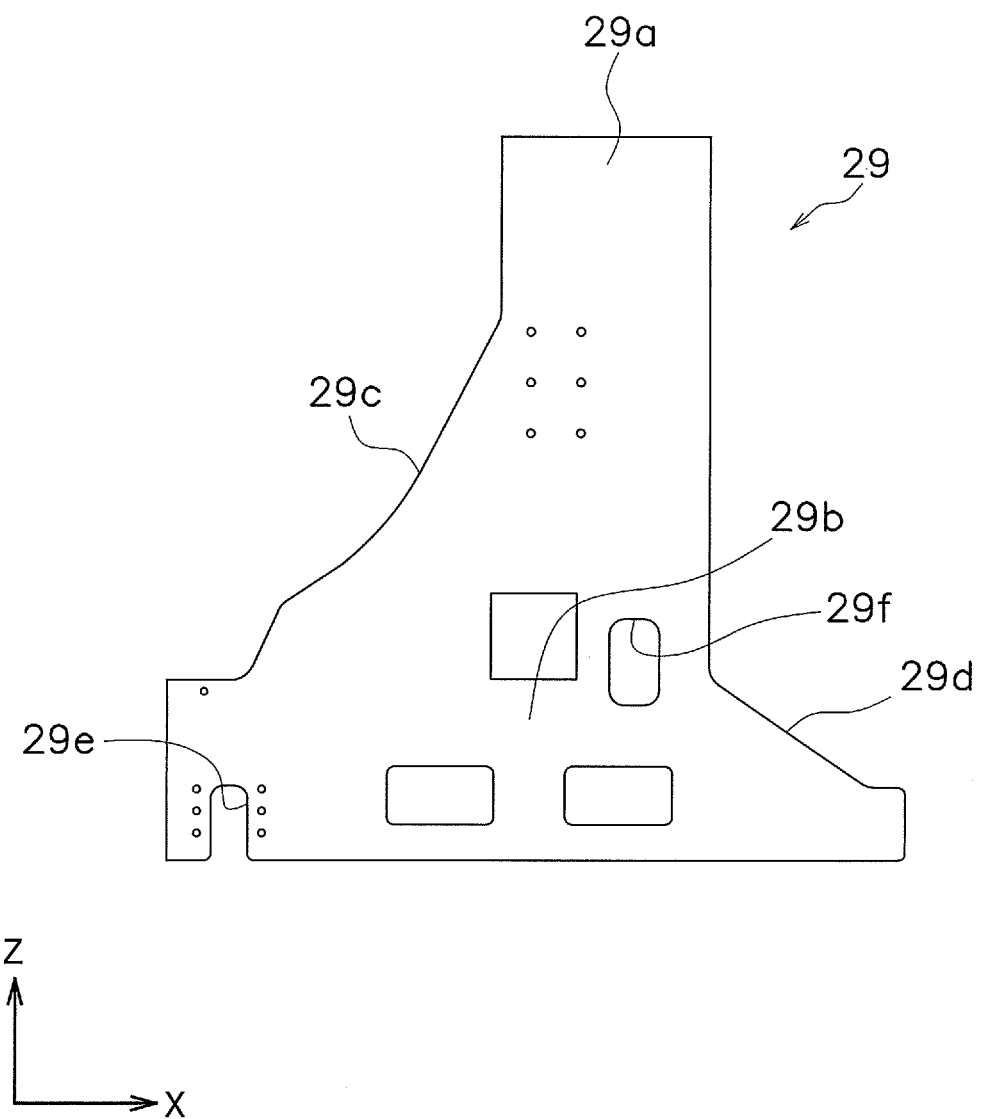
FIG. 9 is a front view of a connecting plate.

As shown in FIG. 9, the connecting plate 29 preferably includes an upper portion 29a and a lower portion 29b. The upper portion 29a extends long in the Z direction, and the lower portion 29b extends long in the X direction. Accordingly, the width of the lower portion 29b (the X directional length) is greater than the width of the upper portion 29a. In addition, the connecting plate 29 includes a first tilted surface 29c that extends diagonally on the outer side in the X direction and a second tilted surface 29d that extends diagonally on the inner side in the X direction. The second tilted surface 29d is provided at a position that is lower than that of the first tilted surface 29c. In the connecting plate 29, a notch 29e, which extends in the Z direction and is open on the lower side, is further provided in a lower surface of an outer side portion in the X direction.

As described above, the first tilted surface 29c and the second tilted surface 29d are provided on the connecting plate 29. These structures are configured to block any shaking (tilting in the X direction) of the first mast 13a and the second mast 13b. In the present preferred embodiment, providing the first tilted surface 29c at a comparatively high position is effective in blocking movement that would cause the first mast 13a or the second mast 13b to topple toward the outer side in the X direction.

The first lower hollow frame 27a and the second lower hollow frame 27b are fixed to the lower portion 29b of the connecting plate 29. In greater detail, a first end of the first lower hollow frame 27a is fixed to an outer side surface in the Y direction of the lower portion 29b of the first plate 29A, and a second end of the first lower hollow frame 27a is fixed to an outer side surface in the Y direction of the lower portion 29b of the third plate 29C. In addition, a first end of the second lower hollow frame 27b is fixed to an outer side surface in the Y direction of the lower portion 29b of the second plate 29B, and a second end of the second lower hollow frame 27b is fixed to an outer side surface in the Y direction of the lower portion 29b of the fourth plate 29D.

Furthermore, lower ends of the first mast 13a and the second mast 13b are fixed to the upper portions 29a of the connecting plates 29. In greater detail, the lower end of the first mast 13a is fixed to an inner side surface in the Y direction of the upper portion 29a of the first plate 29A and to an inner side surface in the Y direction of the upper portion 29a of the second plate 29B. In addition, the lower end of the second mast 13b is fixed to an inner side surface in the Y direction of the upper portion 29a of the third plate 29C and to an inner side surface in the Y direction of the upper portion 29a of the fourth plate 29D.

As described above, the first mast 13a and the second mast 13b are fixed to the first lower hollow frame 27a and the second lower hollow frame 27b via the connecting plates 29. In addition, based on the above configuration, the connecting plates 29 define and function as ribs that support the first mast 13a and the second mast 13b. Accordingly, the stresses that act on the first mast 13a and the second mast 13b are reduced. As a result, higher performance of the stacker crane 1 is achieved.

The first travelling wheel unit 21a and the second travelling wheel unit 21b will be explained in further detail.

The first travelling wheel unit 21a and the second travelling wheel unit 21b are mounted to the lower portions 29b of the connecting plates 29. As shown in FIG. 3, FIG. 5, and FIG. 14, the first travelling wheel unit 21a and the second travelling wheel unit 21b each include the travelling wheel 49. The travelling wheels 49 define and function as follower wheels and are configured such that they roll on a top surface of the lower guide rail 5b (a top surface of the horizontal portion 5d). Accordingly, the stresses that act on the connecting plates 29 are reduced.

Specifically, as shown in FIG. 14, the first travelling wheel unit 21a includes a first travelling wheel 49a, a first shaft member 51a, and a first bearing 53a. The first travelling wheel 49a is fixed to both ends of the first shaft member 51a via the first bearing 53a. As shown in FIG. 14, the first shaft member 51a extends in the Y direction and both ends thereof are fixed to a pair of the connecting plates 29 (the pair of connecting plates 29 fixed to the first lower hollow frame 27a and the second lower hollow frame 27b on one side in the X direction, that is, the first plate 29A and the second plate 29B).

The second travelling wheel unit 21b preferably has the same structure as that of the first travelling wheel unit 21a and, although not illustrated, has a second travelling wheel 49b, a second shaft member (not shown), and a second bearing (not shown). The second travelling wheel 49b is fixed to both ends of the second shaft member via the second bearing. The second shaft member extends in the Y direction, and both ends thereof are fixed to a pair of the connecting plates 29 (the pair of connecting plates 29 fixed to the first lower hollow frame 27a and the second lower hollow frame 27b on the opposite side in the X direction, that is, the third plate 29C and the fourth plate 29D).

As discussed above, both shaft ends of the first travelling wheel 49a are rotatably supported by the first plate 29A and the second plate 29B. Both shaft ends of the second travelling wheel 49b are rotatably supported by the third plate 29C and the fourth plate 29D. Thus, the connecting plates 29 are configured to support the travelling wheels 49, which reduces the portion count.

Figure 15:
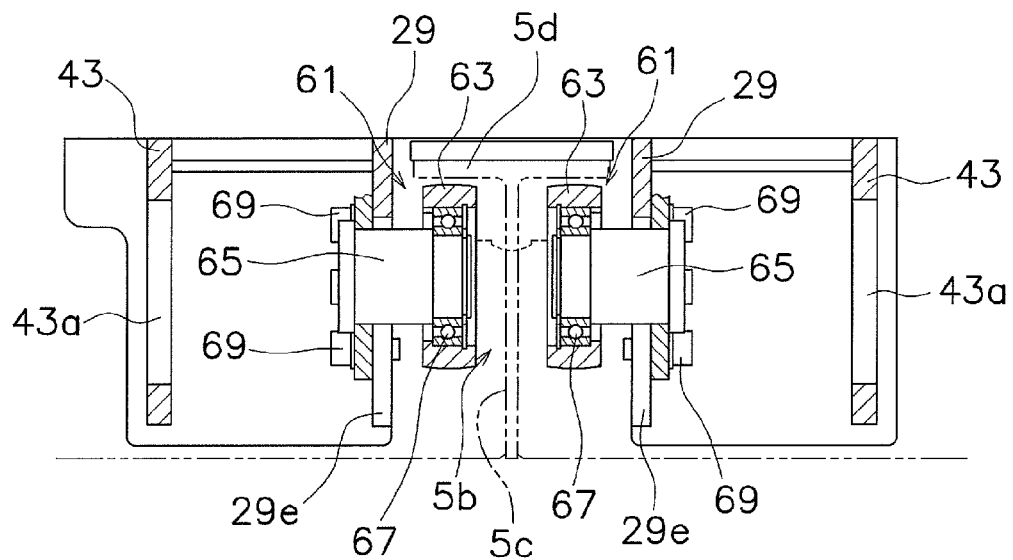
FIG. 15 is a cross sectional view taken along the line XV-XV in FIG. 4.

Furthermore, as shown in FIG. 15, floating prevention roller units 61 are mounted to the lower portions 29b (more specifically, the notches 29e) of the connecting plates 29. Accordingly, the attachment of the floating prevention roller units 61 to the connecting plates 29 and the detachment of the floating prevention roller units 61 from the connecting plates 29 are easy. Thus, the inspection and replacement of the floating prevention roller units 61 become easy.

More specifically, as shown in FIG. 15, the floating prevention roller units 61 are disposed on the inner sides of the connecting plates 29 in the Y direction and are mounted to the notches 29*e*. Each floating prevention roller unit 61 includes a roller 63, a shaft member 65, and a bearing 67. Each roller 63 is disposed proximate to and downward of the horizontal portion 5*d* of the lower guide rail 5*b*. Each roller 63 is rotatably supported by one end of its corresponding shaft member 65 via its corresponding bearing 67. Each shaft member 65 is mounted to its corresponding notch 29*e* and, furthermore, another end is fixed to its corresponding connecting plate 29. Furthermore, bolts 69 that fix the shaft members 65 to the connecting plates 29 are able to be operated through the openings 43*a* of the reinforcing plates 43 and the notches 27*e* of the first lower hollow frame 27*a* and the second lower hollow frame 27*b*. Accordingly, the mounting and dismounting of the floating prevention roller unit 61 become easy.

Furthermore, the floating prevention roller units 61 should be moved to the upper side in the Z direction when being mounted to the notches 29*e* and should be moved to the lower side in the Z direction when being dismounted from the notches 29*e*.

Furthermore, because the rotatable rollers 63 are used as a floating prevention mechanism, even if the travelling vehicle main body 19 were to float up while travelling (particularly during acceleration and deceleration), the load between the lower guide rail 5*b* and the floating prevention mechanism is reduced. As a result, the burden on both the lower guide rail 5*b* and the travelling vehicle main body 19 is lessened.

The configuration positions of the first controller 45*a* and the second controller 45*b* will be explained in further detail.

The support members 47 are four members, and one support member 47 is fixed to each of the connecting plates 29. Each support member 47 includes a fixed portion 47*a* and a support portion 47*b*. One of the fixed portions 47*a* is fixed to the outer side surface in the Y direction of each of the connecting plates 29. The fixing positions of the fixed portions 47*a* are the upper portions 29*a* of the connecting plates 29. The support portion 47*b* extends from the outer side of the fixed portion 47*a* in the X direction. In so doing, as shown in FIG. 3, the first controller 45*a* is disposed on the two support portions 47*b* that are on one side end in the X direction and adjacent in the Y direction, and the second controller 45*b* is disposed on the two support portions 47*b* that are on the opposite side end in the X direction and adjacent in the Y direction.

As discussed above, space saving is achieved because the connecting plates 29 are what fix the first controller 45*a* and the second controller 45*b* via the support members 47. In particular, as shown in FIG. 3 and FIG. 4, the support portions 47*b* of the support members 47 are disposed proximate to the upper ends of the first lifting drive motor 41*a* and the second lifting drive motor 41*b*. Accordingly, the installation positions of the first controller 45*a* and the second controller 45*b* are capable of being lowered. In particular, as discussed later, because the first lifting drive motor 41*a* and the second lifting drive motor 41*b* are tilted and their heights are low, the installation positions of the first controller 45*a* and the second controller 45*b* are capable of being lowered.

The travelling drive mechanism 23 will be further explained.

Figure 11:
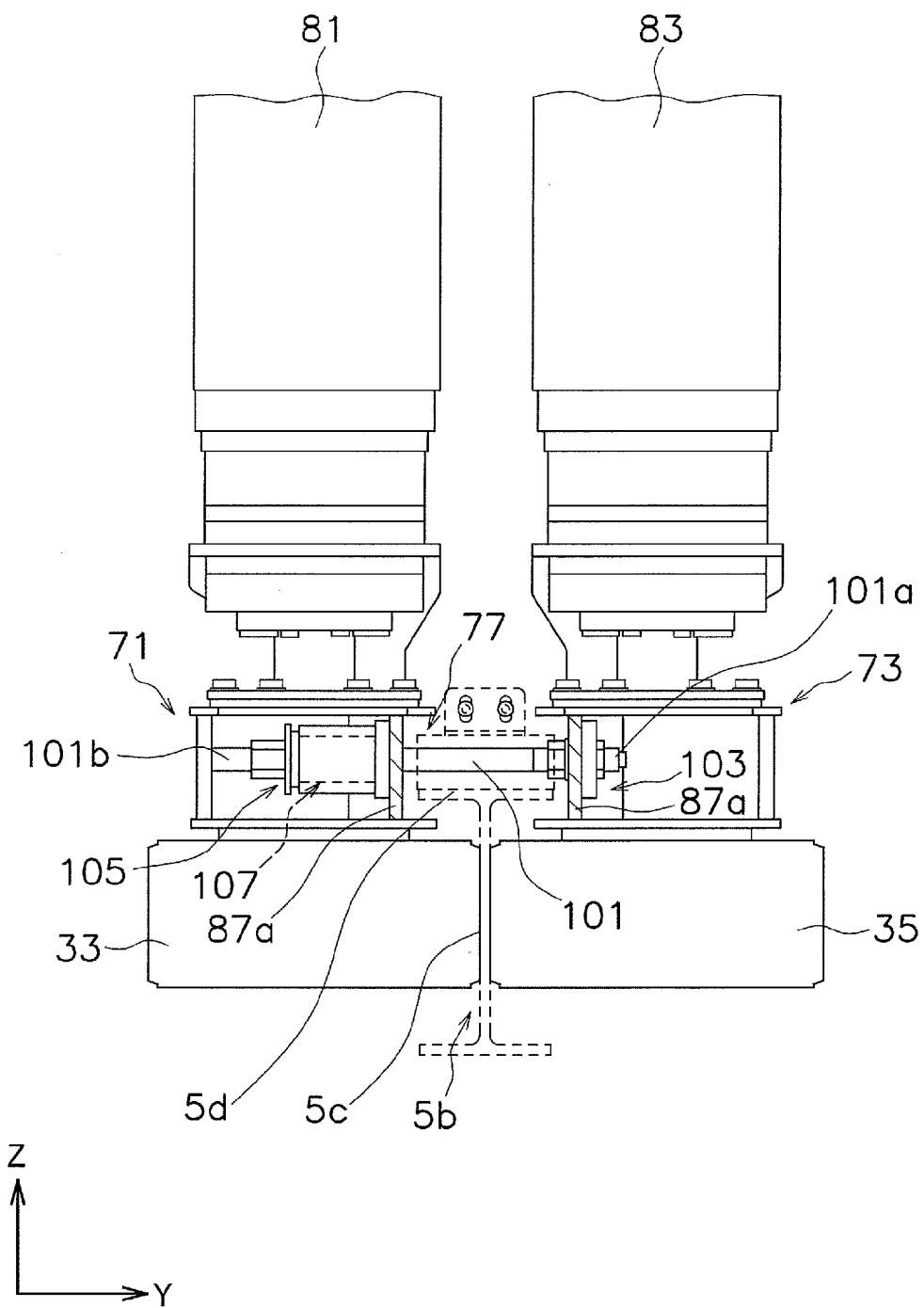
FIG. 11 is a front view of the drive wheel unit.
Figure 12:
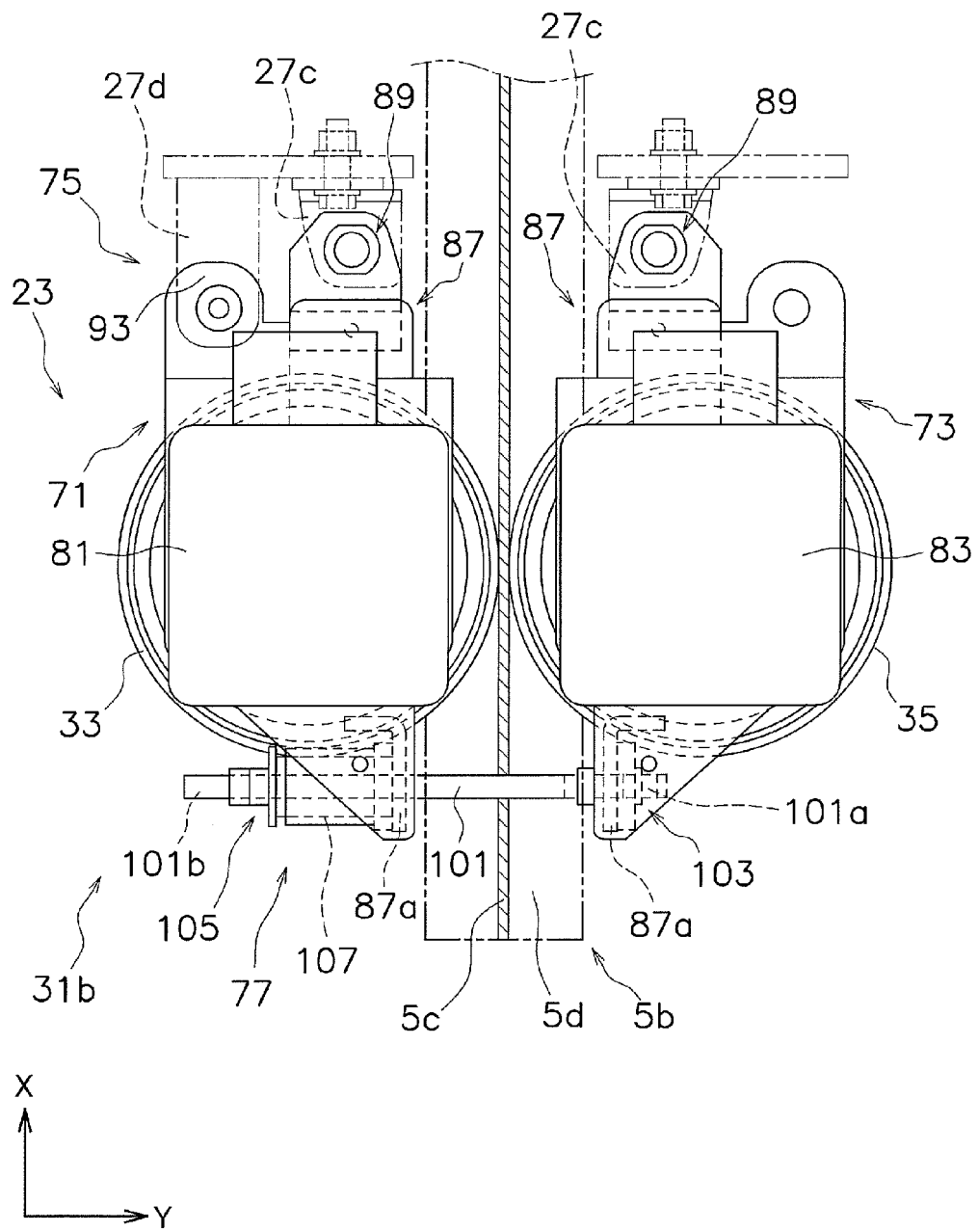
FIG. 12 is a plan view of the drive wheel unit.

The first drive wheel unit 31*a* and the second drive wheel unit 31*b* are mounted to the first lower hollow frame 27*a* and the second lower hollow frame 27*b*. The first drive wheel unit 31*a* and the second drive wheel unit 31*b* are each supported by both end portions in the X direction of the first lower hollow frame 27*a* and the second lower hollow frame 27*b* and include the first drive wheel 33 and the second drive wheel 35. Thus, a set of the first drive wheel 33 and the second drive wheel 35 preferably is disposed at each end on both sides of the travelling vehicle main body 19 in the X direction; that is, the stacker crane 1 preferably includes a total of four of the drive wheels. As shown in FIG. 4, FIG. 11, and FIG. 12, the first drive wheels 33 and the second drive wheels 35 are capable of making contact with side surfaces of the lower guide rail 5*b* (side surfaces of the erect portion 5*c*).

Figure 10:
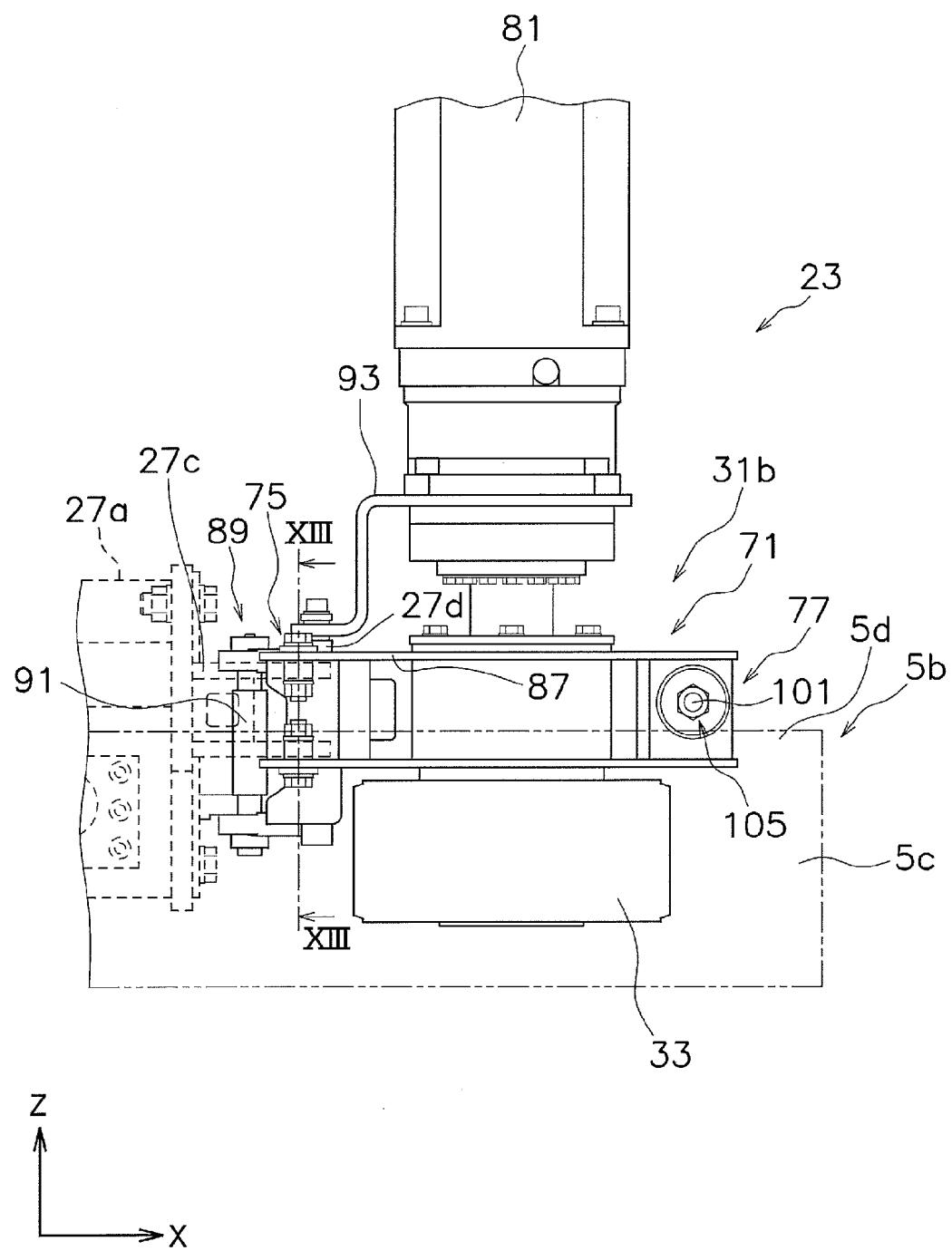
FIG. 10 is a side view of a drive wheel unit.
Figure 13:
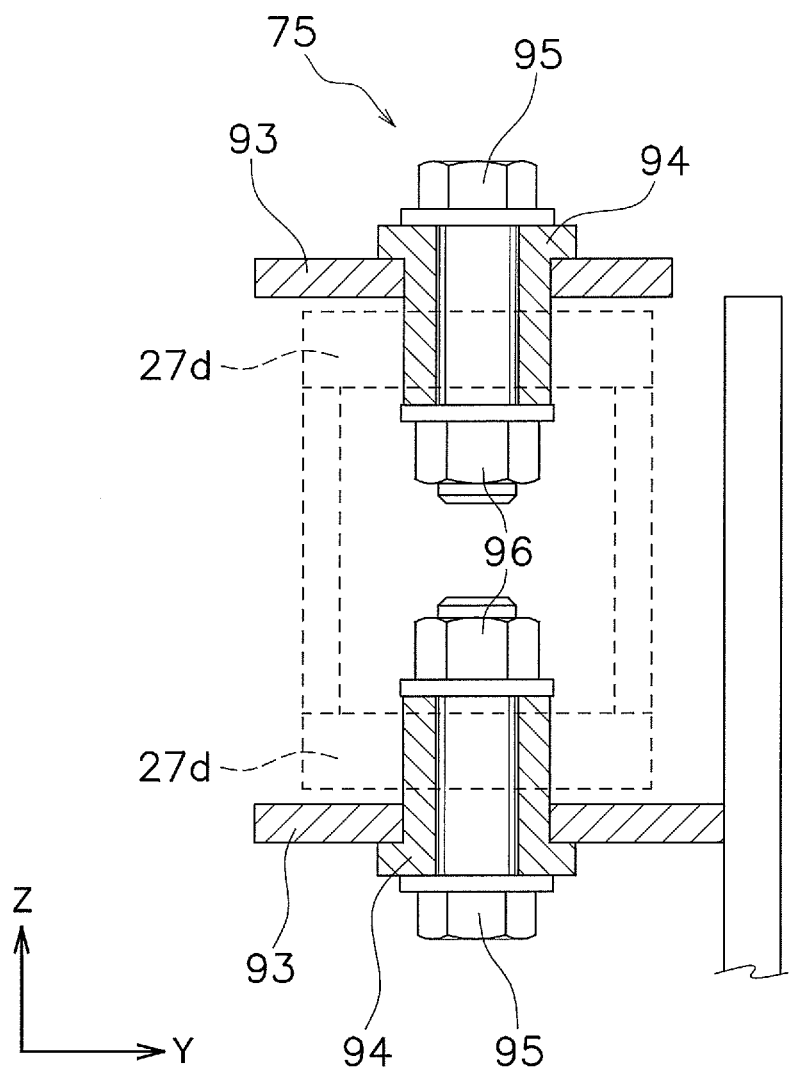
FIG. 13 is a cross sectional view taken along the line XIII-XIII in FIG. 10.

As shown in FIG. 11 and FIG. 12, the first drive wheel unit 31*a* and the second drive wheel unit 31*b* preferably each include a first wheel supporting portion 71 and a second wheel supporting portion 73. Thus, each set of the first wheel supporting portion 71 and the second wheel supporting portion 73 preferably is disposed at each end on both sides of the travelling vehicle main body 19 in the X direction; that is, the stacker crane 1 preferably includes a total of four of the wheel supporting portions. The first wheel supporting portions 71 are horizontally pivotably fixed to the first lower hollow frame 27*a* and the second lower hollow frame 27*b* of the travelling vehicle main body 19 (the details of which are discussed later). The first drive wheel 33 is supported by the first wheel supporting portion 71 and makes contact with one side surface of the lower guide rail 5*b*. As shown in FIG. 10, FIG. 12, and FIG. 13, a lock mechanism 75 non-pivotably fixes the first wheel supporting portion 71 to the first lower hollow frame 27*a* and the second lower hollow frame 27*b* of the travelling vehicle main body 19 (the details of which are discussed later).

The second wheel supporting portion 73 is horizontally pivotably fixed to the first lower hollow frame 27*a* and the second lower hollow frame 27*b* of the travelling vehicle main body 19 (the details of which are discussed later). The second drive wheel 35 is supported by the second wheel supporting portion 73 and makes contact with another side surface of the lower guide rail 5*b*. A pressing mechanism 77 (one example of a pressing mechanism) urges the first wheel supporting portion 71 and the second wheel supporting portion 73 in a direction that narrows the spacing between them, and that urging is released by the removal of the pressing mechanism 77. In addition, the above-described mechanism makes a guide roller unnecessary.

In the stacker crane 1, the first drive wheels 33 and the second drive wheels 35 clamp the side surfaces of the lower guide rail 5*b* by the urging of the pressing mechanisms 77. The travelling vehicle main body 19 travels in this state, and therefore variations in wheel pressure tends not to occur.

In addition, the impact of wheel pressure fluctuation is small, and therefore the pressing force that acts on the drive wheels is able to be set to a proper value that is not excessively large. As a result, the size of the drive wheels is reduced and the lifespan of the drive wheels is extended. Conventionally, if the left-right balance degrades due to wheel pressure fluctuations, the size of the drive wheels must be increased in order to handle a larger load.

In addition, the first wheel supporting portions 71 are non-pivotably fixed to the travelling vehicle main body 19 by way of the lock mechanisms 75. However, if the pressing mechanisms 77 are detached and, furthermore, the lock mechanisms 75 are released, then the first wheel supporting portions 71 and the second wheel supporting portions 73 both are able to pivot in direction away from one another. Thus, the first drive wheels 33 and the second drive wheels 35 become spaced apart from the lower guide rail 5*b*, and the maintenance (replacement, adjustment, and repair) of both drive wheels becomes easy.

The travelling drive mechanism 23 includes the first travelling drive motors 81 and the second travelling drive motors 83. By virtue of being fixed to the first wheel supporting portions 71, the first travelling drive motors 81 are horizontally pivotable with respect to both the first drive wheels 33 and the travelling vehicle main body 19. The first travelling drive motors 81 are capable of driving the first drive wheels 33. By virtue of being fixed to the second wheel supporting portions 73, the second travelling drive motors 83 are horizontally pivotable with respect to both the second drive wheels 35 and the travelling vehicle main body 19. The second travelling drive motors 83 are capable of driving the second drive wheels 35. Thus, a set of the first travelling drive motor 81 and the second travelling drive motor 83 preferably is disposed at each end on both sides of the travelling vehicle main body 19 in the X direction; that is, the stacker crane 1 preferably includes a total of four travelling drive motors. In this case, because the first travelling drive motors 81 and the second travelling drive motors 83 are able to horizontally pivot with respect to the first wheel supporting portions 71 and the second wheel supporting portions 73, respectively, the torque transmitting mechanism of the motor during maintenance is spaced apart from the lower guide rail and consequently does not interfere with maintenance.

The second drive wheel 35 of the first drive wheel unit 31a and the second drive wheel 35 of the second drive wheel unit 31b are disposed on the same side of the lower guide rail 5b in the Y direction. Accordingly, the stacker crane 1 travels stably and rectilinearly.

The structure wherein the first wheel supporting portions 71 and the second wheel supporting portions 73 pivot freely will be explained in detail.

As shown in FIG. 10 through FIG. 12, the first wheel supporting portion 71 and the second wheel supporting portion 73 each include a support member 87 and a pivoting support member 89. The support member 87 is a member including a plurality of plates extending in the X direction and, due to the pivoting support member 89, the inner side end in the X direction of the support member 87 pivots freely in the horizontal direction with respect to the first lower hollow frame 27a and the second lower hollow frame 27b. Namely, the pivoting centers of the first wheel supporting portion 71 and the second wheel supporting portion 73 are the pivoting support members 89. As shown in FIG. 11 and FIG. 12, the first drive wheel 33 and the first travelling drive motor 81 as well as the second drive wheel 35 and the second travelling drive motor 83 are fixed to the support members 87. Each pivoting support member 89 includes a pin 91 that extends in the Z direction. The pins 91 are attached to protruding plates 27c, which are provided on outer side end portions in the X direction of the first lower hollow frame 27a and the second lower hollow frame 27b, and furthermore pivotably support the support members 87 in the horizontal direction.

As discussed above, the position of the first drive wheel 33 and the second drive wheel 35 and the position of the pivoting support members 89 differ (they are spaced apart in the X direction as shown in FIG. 12) and therefore, when the first wheel supporting portion 71 or the second wheel supporting portion 73 pivots, the first drive wheel 33 or the second drive wheel 35 moves such that it defines an arcuate trajectory in a plan view. Furthermore, as shown in FIG. 12, the position at which the first drive wheel 33 contacts the lower guide rail 5b and the position at which the second drive wheel 35 contacts the lower guide rail 5b coincide in the X direction.

The structure and the function of the lock mechanism 75 will be explained in detail.

The lock mechanism 75 is configured to limit the pivoting of the first wheel supporting portion 71, the first drive wheel 33, and the first travelling drive motor 81 in the horizontal direction. As shown in FIG. 13, the lock mechanism 75 includes plates 93, collars 94, bolts 95, and nuts 96. The plates 93 are a pair of members extending from the lower portion of the first travelling drive motor 81. The plates 93 are disposed on the upward apparatus side and the downward apparatus side of a pair of protruding portions 27d provided at outer side end portions in the X direction of the first lower hollow frame 27a and the second lower hollow frame 27b. The collars 94 are disposed such that they pass through holes provided in the plates 93 and the protruding portions 27d. Main body portions of the bolts 95 pass through the interior of the collars 94, and the nuts 96 are screwed onto tips of the bolts 95. In this way, due to the bolts 95 and the nuts 96, the collars 94 cannot come off of the plates 93 and the protruding portions 27d. As a result, the plates 93, namely, the first wheel supporting portion 71, the first drive wheel 33, and the first travelling drive motor 81, cannot pivot in the horizontal direction due to the collars 94.

Furthermore, if the bolts 95 and the nuts 96 are operated and the collars 94 are removed, then the plates 93, namely, the first wheel supporting portion 71, the first drive wheel 33, and the first travelling drive motor 81, become pivotable in the horizontal direction.

The structure and the function of the pressing mechanism 77 will be explained in detail.

The pressing mechanism 77 includes a shaft 101 and an elastic member 107. As shown in FIG. 10, FIG. 11, and FIG. 12, the shaft 101 is disposed on outer sides of the pair of support members 87 in the X direction and extends in the Y direction. Both ends of the shaft 101 pass through protruding portions 87a, which are provided on outer sides of the support members 87 in the X direction. A first end 101a of the shaft 101 is fixed by a nut and a plate 103 to the protruding portion 87a of the support member 87 of the second wheel supporting portion 73. A second end 101b of the shaft 101 is elastically supported in the Y direction by the elastic member 107. Specifically, the elastic member 107 is disposed at the protruding portion 87a of the support member 87 of the first wheel supporting portion 71 on the side opposite the second wheel supporting portion 73 and is supported by a nut and a plate 105 that are fixed to the second end 101b of the shaft 101. The elastic member 107 is compressed in the Y direction between the protruding portion 87a on one side and the nut and the plate 105 on the other side. Accordingly, the elastic member 107 imparts an urging force to the first wheel supporting portion 71 and the second wheel supporting portion 73 such that they draw near in the Y direction. As a result, the first drive wheel 33 and the second drive wheel 35 make contact with, such that they clamp the side surfaces of the lower guide rail 5b (both surfaces of the erect portion 5c). Furthermore, the elastic member 107 preferably is a spring, for example, a compression coil spring.

Furthermore, the first wheel supporting portion 71 and the second wheel supporting portion 73 are able to be removed by, in the pressing mechanism 77, removing the nut and the plate 103 as well as the nut and the plate 105 from the shaft 101 and, furthermore, pulling the shaft 101 out of the protruding portion 87a.

Furthermore, the type of the pressing mechanism is not limited to the above-described preferred embodiment. In particular, the structure that attachably and detachably links to the wheel supporting portions is not limited to the combination of the shaft, the nuts, and the plates. In addition, the presence or absence, the type, and the arrangement position of the elastic member is not limited to the above-described preferred embodiment.

Figure 16:
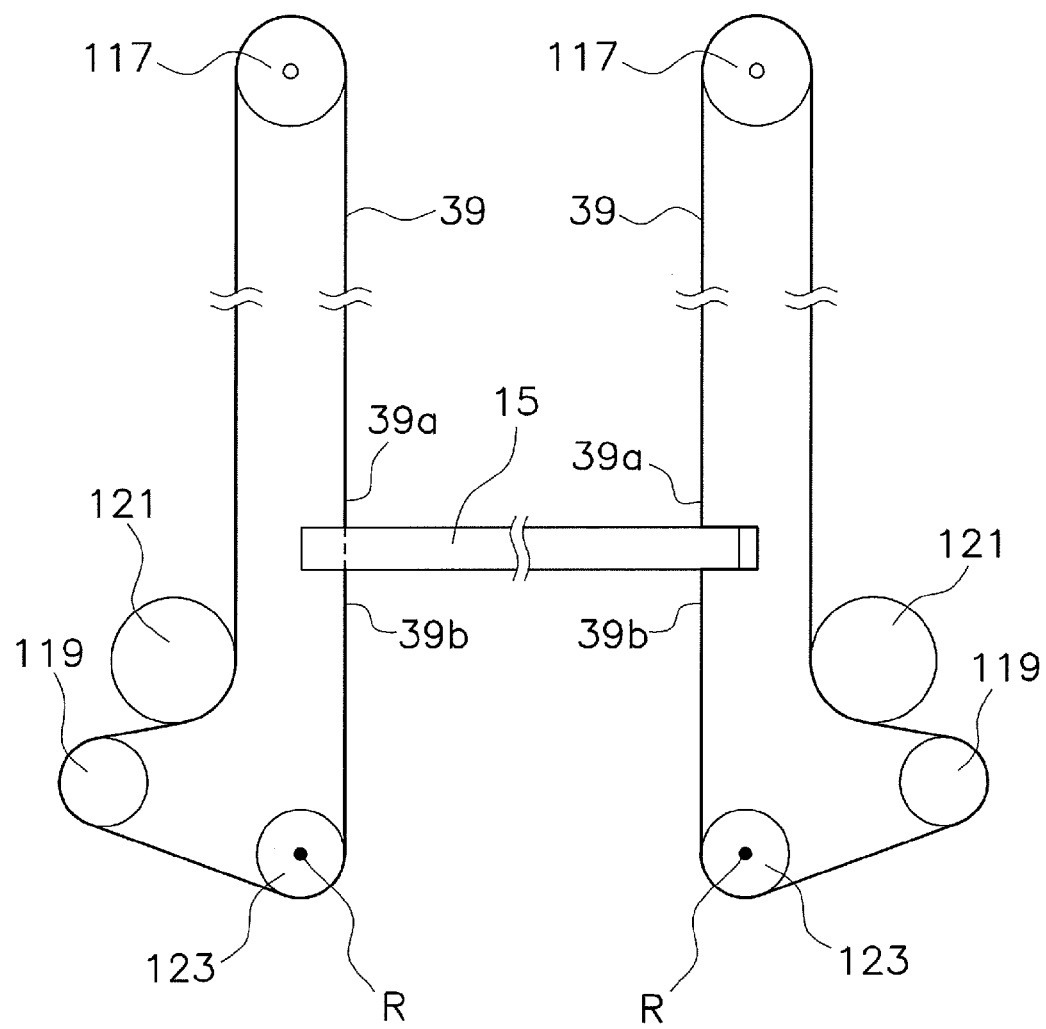
FIG. 16 is a schematic drawing of hanging belts and pulleys.
Figure 16:
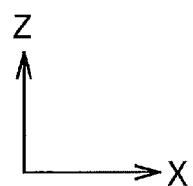

As schematically shown in FIG. 16, the lifting drive mechanism 37 includes the lift platform 15, the pair of hanging belts 39, a pair of upper pulleys 117, a pair of drive pulleys 119, a pair of idler pulleys 121, lower pulleys 123, the first lifting drive motor 41a, and the second lifting drive motor 41b.

The drive pulleys 119, the idler pulleys 121, and the lower pulleys 123 are rotationally supported by the pair of connecting plates 29. The direction in which the rotary shafts of these pulleys extend is the Y direction. More specifically, both shaft ends of the drive pulleys 119 and the idler pulleys 121 are directly supported by the pair of connecting plates 29, and both shaft ends of the lower pulleys 123 are supported by the pair of connecting plates 29 via supporting members 127 (discussed later) of tensioning mechanisms 125 (discussed later). That is, the drive pulleys 119, the idler pulleys 121, and the lower pulleys 123 are disposed between the pair of connecting plates 29 in the Y direction.

As is clear from the drawings, each member of the lifting drive mechanism 37 is provided symmetrically at both ends in the X direction, and therefore the configuration of only one side in the X direction will be explained below.

The hanging belt 39 is an endless drive belt that includes a first end 39a, which is fixed to an upper portion of the lift platform 15, and a second end 39b, which is fixed to a lower portion of the lift platform 15. The upper pulley 117 is disposed at the upper end—one upper pulley 117 per upper end—of the first mast 13a and the second mast 13b. The drive pulley 119 is configured to move the hanging belt 39 forward and in reverse by the driving force of the first lifting drive motor 41a or the second lifting drive motor 41b. The idler pulley 121 is disposed in the vicinity of the drive pulley 119 and, more specifically, is disposed upward of and on the inner side in the X direction of the drive pulley 119. The lower pulley 123 is disposed at the lower portion—one lower pulley 123 per lower portion—of the first mast 13a and the second mast 13b. The lower pulley 123 is disposed on the inner side of the drive pulley 119 in the X direction. The hanging belt 39 is looped around, in order starting from the first end 39a, the upper pulley 117, the idler pulley 121, the drive pulley 119, and the lower pulley 123, and ends at the second end 39b.

As shown in FIG. 4, the first lifting motor 41a and the second lifting drive motor 41b are fixed to outer side portions of the lower portions 29b of the connecting plates 29 in the X direction. Because the first lifting drive motor 41a and the second lifting drive motor 41b are fixed to the connecting plates 29 rather than to the first mast 13a and the second mast 13b, the stress that acts on the first mast 13a and the second mast 13b is reduced. In addition, because the attitude of the first lifting drive motor 41a and the second lifting drive motor 41b is in a tilted state, space saving in the Z direction is achieved more than it would be in an erect state. Furthermore, that the first lifting drive motor 41a and the second lifting drive motor 41b are tilted indicates the state wherein their main bodies are disposed such that their upper portions are positioned offset to the outer side in the X direction with respect to their lower portions. Accordingly, the size of the first lifting drive motor 41a and the second lifting drive motor 41b in the Y direction is not increased.

More specifically, the first lifting drive motor 41a is fixed to an outer side surface of the second plate 29B in the Y direction, and the second lifting drive motor 41b is fixed to an outer side surface of the fourth plate 29D in the Y direction. That is, the first lifting drive motor 41a and the second lifting drive motor 41b are disposed on the outer sides of the pair of connecting plates 29 in the Y direction; that is, the first lifting drive motor 41a and the second lifting drive motor 41b are disposed at positions offset to one side (the upper side in FIG. 5) in the Y direction from the center of the travelling vehicle main body 19 in the Y direction, and therefore the space between the pair of connecting plates 29 is effectively utilized. In particular, because the first lifting drive motor 41a and the second lifting drive motor 41b are disposed on the same side in the Y direction, access to both is simplified.

The lifting drive mechanism 37 includes the tensioning mechanisms 125. The tensioning mechanisms 125 are mechanisms that apply tension to the hanging belts 39 by urging the lower pulleys 123 downward. The tensioning mechanisms 125 are disposed between pairs of the connecting plates 29 (between the first plate 29A and the second plate 29B, and between the third plate 29C and the fourth plate 29D).

Figure 17:
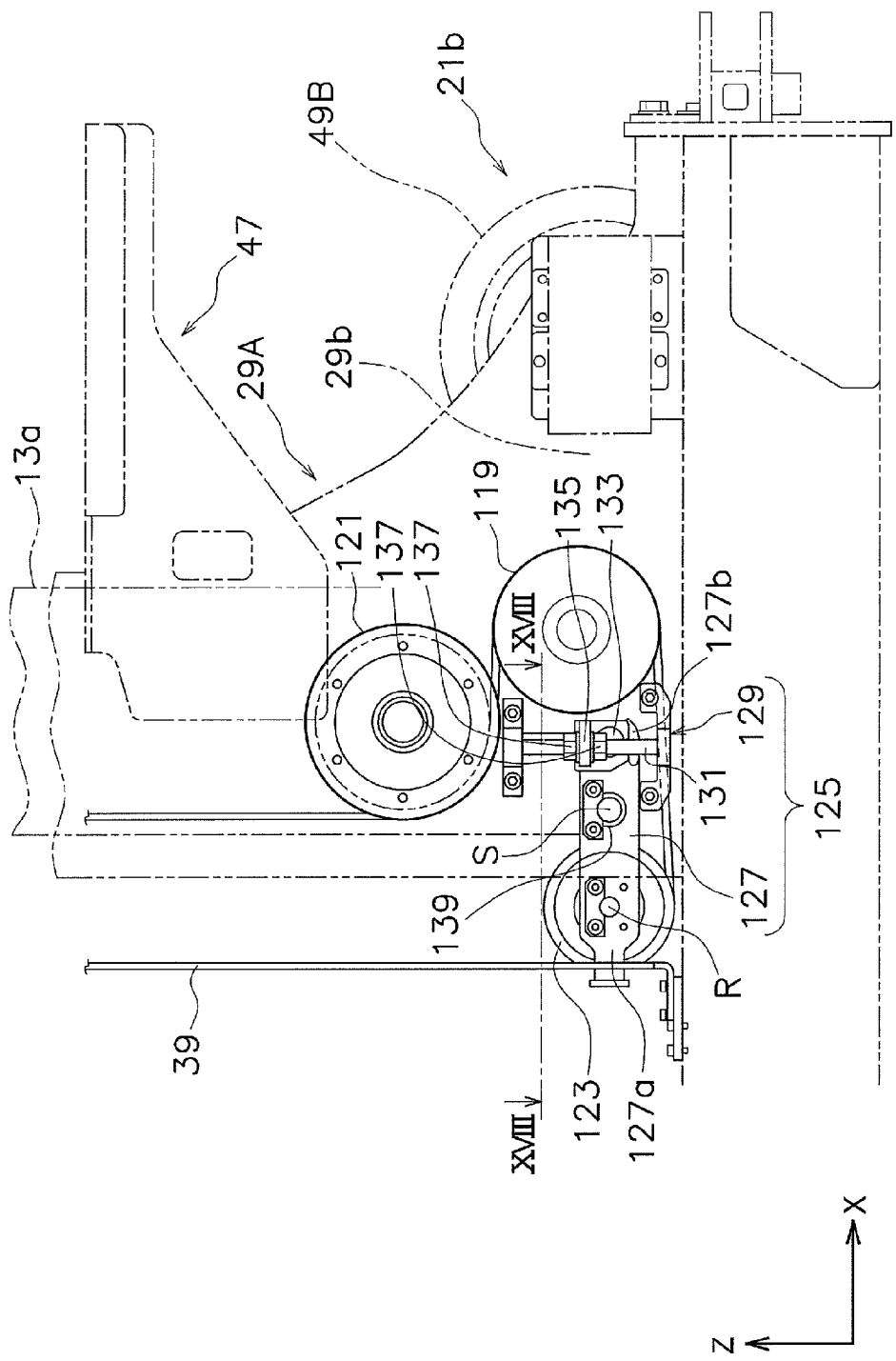
FIG. 17 is a front view of a tensioning mechanism.
Figure 18:
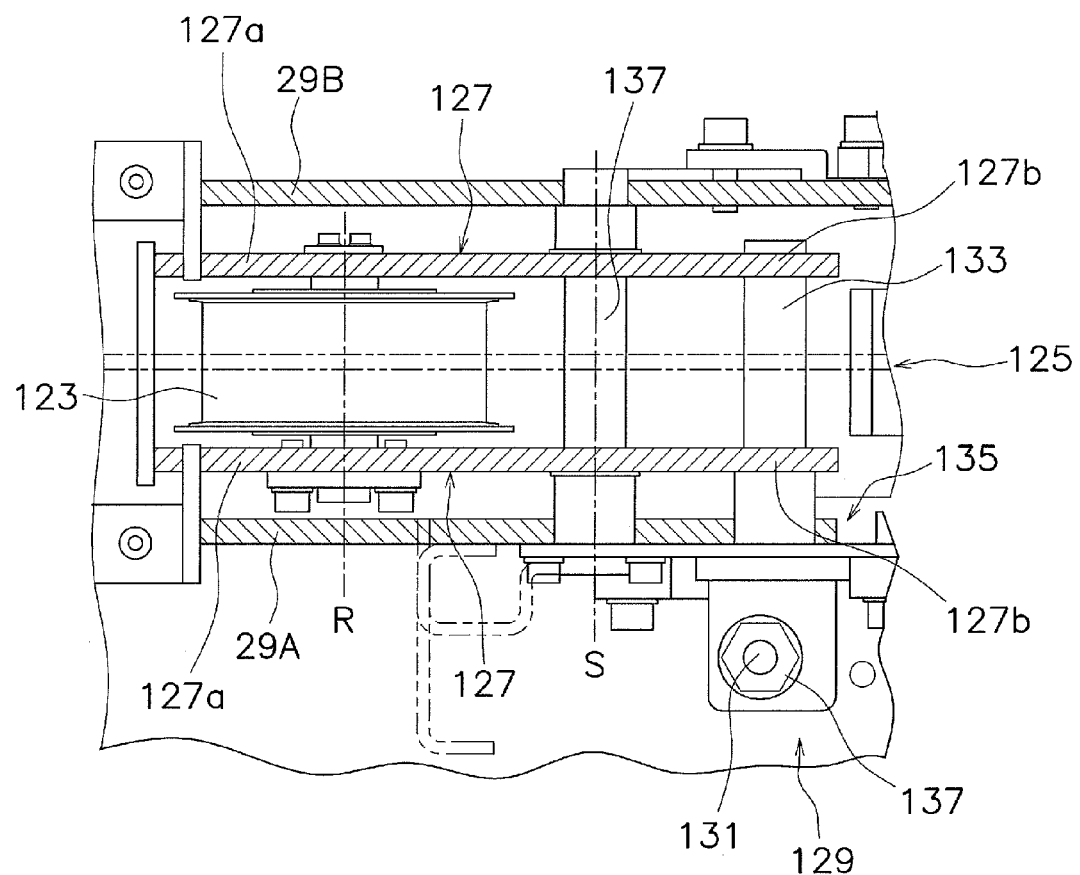
FIG. 18 is a cross sectional view taken along the line XVIII-XVIII in FIG. 17.
Figure 19:
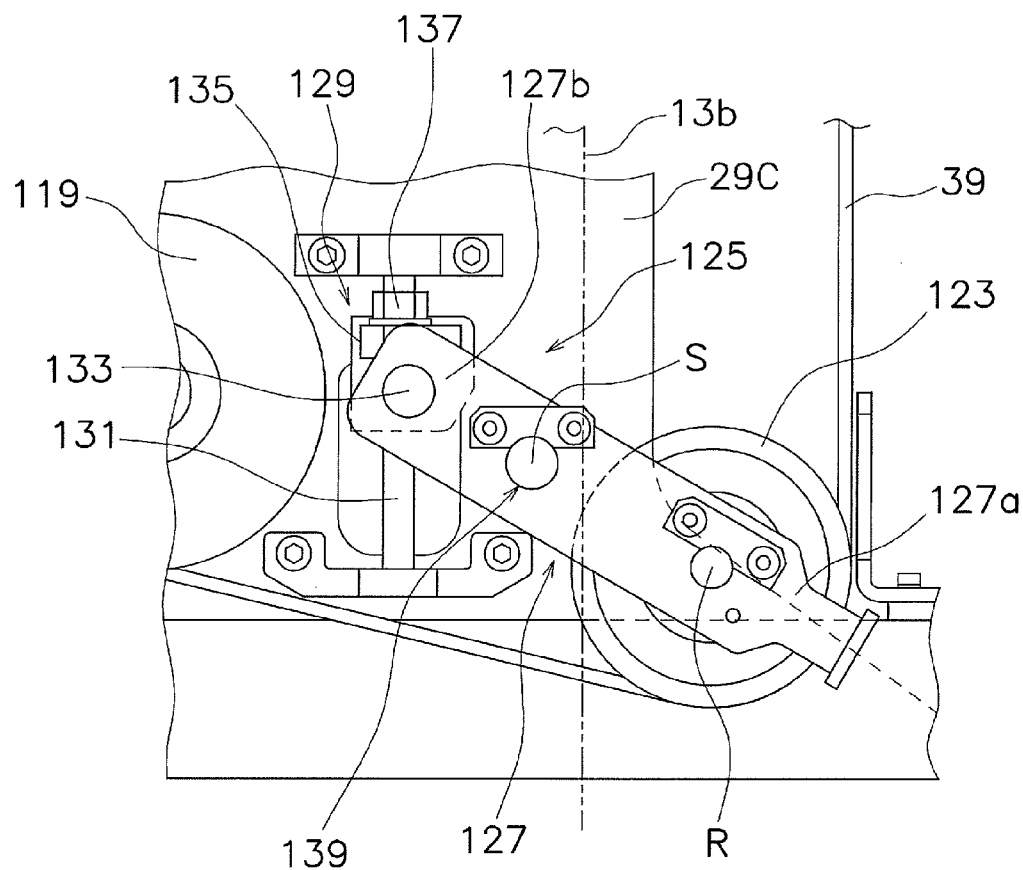
FIG. 19 is a partial front view of the tensioning mechanism.

As shown in FIG. 17, FIG. 18, and FIG. 19, the tensioning mechanism 125 includes the supporting members 127 and a supporting-member-fixing mechanism 129. The supporting members 127 are disposed between (in the Y direction) the first plate 29A and the second plate 29B. The supporting members 127 include a pair of plate members that rotationally support both ends of the rotary shaft of the lower pulley 123. The supporting members 127 extend long in the X direction, and the lower pulley 123 is rotationally supported by a first end portion 127a.

The supporting members 127 include an intermediate portion that is pivotably supported around a fulcrum S with respect to the connecting plates 29. Specifically, the fulcrum S is implemented by virtue of both ends of a pin 139—the pin 139 extending in the Y direction and being fixed to the supporting members 127 in the vicinity of the middle of the supporting members 127 in the X direction—being rotationally supported by the connecting plates 29. Thus, the supporting members 127 are pivotable around the fulcrum S, which is spaced apart from the center of rotation of the lower pulley 123 in the X direction. Specifically, the supporting members 127 include the first end portions 127a and second end portions 127b, which are portions disposed on both sides of the fulcrum S. The first end portions 127a rotationally support the lower pulley 123, and the second end portions 127b are positioned by the supporting-member-fixing mechanism 129.

Furthermore, the first end portions 127a of the supporting members 127 are portions that extend on one side of the fulcrum S in the X direction, and one point of each of the first end portions 127a is a support portion that supports the lower pulley 123. In addition, the second end portions 127b are portions that extend on the opposite side of the fulcrum S in the X direction, and one point of each of the second end portions 127b is a supported portion that is supported and fixed by the supporting-member-fixing mechanism 129.

The supporting-member-fixing mechanism 129 is a mechanism that determines the tension applied to the hanging belt by fixing the attitude of the supporting members 127. Specifically, the supporting-member-fixing mechanism 129 pivots the supporting members 127 by changing the position of the second end portions 127b of the supporting members 127 in the up and down direction, and thus changes the position of the first end portions 127a of the supporting members 127, namely, the position of the lower pulley 123. Furthermore, the supporting-member-fixing mechanism 129 fixes the attitude of the supporting members 127 by fixing the position of the second end portions 127b of the supporting members 127 in the up and down direction.

The objects to which the supporting-member-fixing mechanisms 129 are attached are the first plate 29A and the third plate 29C. That is, the connecting plates to which the lifting drive motors are mounted and the connecting plates to which the supporting-member-fixing mechanisms are provided are different. In particular, the supporting-member-fixing mechanisms 129 are disposed on the same side in the Y direction, and therefore access to both is simplified.

Each supporting-member-fixing mechanism 129 includes a screw member 131, a pin 133, a linking member 135, and two nuts 137. The screw member 131 extends in the Z direction and is fixed to, for example, the first plate 29A in the vicinity of the second end portions 127b of the supporting members 127. The pin 133 extends in the Y direction from the second end portions 127b of the supporting members 127, specifically, toward the screw member 131. The linking member 135 includes a portion that rotationally supports the pin 133 and a plate-shaped portion wherein a hole through which the screw member 131 passes is provided. The two nuts 137 are screwed onto the screw member 131 and disposed on both sides of the plate-shaped portion of the linking member 135 in the Z direction.

Based on the above structure, if, for example, the two nuts 137 are moved to the upper side in the Z direction, then, as shown in FIG. 19, the second end portions 127b of the supporting members 127 move upward via the linking member 135 and the pin 133 and, attendant therewith, the support members 127 pivot around the fulcrum S due to the pin 139. As a result, the first end portions 127a of the supporting members 127 move to the lower side in the Z direction. Attendant therewith, the lower pulley 123 also moves to the lower side in the Z direction, and the Z directional position of the lower pulley 123 changes to the lower side of the Z directional position of the drive pulley 119.

Furthermore, the operation of the two nuts 137 is capable of being performed from an opening 29f (refer to FIG. 6 and FIG. 9) formed in the first plate 29A, which serves as a sidewall. Thus, by virtue of being disposed between (in the Y direction) the pairs of connecting plates 29 (e.g., the first plate 29A and the second plate 29B), the hole of each of the tensioning mechanisms 125 is able to be made compact, and the operation of adjusting the connecting plates 29 is able to be performed from the outer sides (the outer sides in the Y direction) of the pairs of connecting plates 29, which makes for good ease of operation.

Thus, in each tensioning mechanism 125, the supporting members 127 are pivoted to change the position of the lower pulley 123 for the purpose of applying tension to the hanging belt 39. Furthermore, the fulcrum S of the pivoting of the supporting members 127 that support the lower pulley 123 is at a position spaced apart from a center of rotation R of the lower pulley 123 in the horizontal direction. Based on the above structure, the tensioning mechanism 125 is a compact structure in the Z direction. For example, only space for a margin of adjustment should be provided in the first mast 13a and the second mast 13b. That is, dead space inside the first mast 13a and the second mast 13b does not become large. In addition, because a tension adjusting mechanism is not disposed in the up and down direction of the lower pulley 123, the most lowered position of the lift platform 15 is made sufficiently low.

As shown in FIG. 4, FIG. 7, FIG. 17, and FIG. 19, the fulcrum S of the supporting members 127 preferably is disposed at a position that overlaps the first mast 13a or the second mast 13b in a plan view. In addition, at least a portion of the lower pulley 123 is disposed at a position that is shifted, to the lift platform 15 side, from the position that overlaps the first mast 13a or the second mast 13b in a plan view. More specifically, in the state shown in FIG. 17, the whole lower pulley 123 is completely shifted from the first mast 13a or the second mast 13b; in the state shown in FIG. 19, a portion of the lower pulley 123 overlaps the first mast 13a or the second mast 13b but mostly is shifted. In other words, even if the lower pulley 123 is disposed most to the mast side, the lower pulley 123 does not move to a position at which it substantially or completely intrudes upon the mast in a plan view. Based on the above positional relationships, by setting the lower pulley 123 at a position shifted to the lift platform 15 side from the first mast 13a or the second mast 13b while disposing the fulcrum S of the supporting members 127 at the same position as the first mast 13a or the second mast 13b, the dead space inside the first mast 13a and the second mast 13b is made small.

In addition, because the structure that swivels the supporting members 127 is adopted, the load to apply tension is increased, even if the generated load is small, if the principle of the lever is used.

Furthermore, the number and positions of the idler pulleys are not limited to the above-described preferred embodiment. For example, the idler pulley may be provided on the side opposite the idler pulley in the above-described preferred embodiment with respect to the drive pulley, or may be provided on both sides of the drive pulley.

Space saving is achieved by the attachment of various mechanisms to the connecting plates 29. In particular, because the connecting plates 29 preferably are thin plate-shaped members whose principal surfaces face the Y direction (that is, they have no thickness in the Y direction), they are effective for space saving. In addition, because the connecting plates 29 are thin plate-shaped members, desirable shapes are implemented as needed.

In addition, the portions through which the first mast 13a and the second mast 13b are inserted preferably are located between the pairs of connecting plates 29. However, because the inner side surfaces of the connecting plates 29 in the Y direction are machined with high precision, the attitudes of the first mast 13a and the second mast 13b are more accurate.

In particular, because various mechanisms are provided on the connecting plates 29, there is no need to provide these mechanisms on the first mast 13a and the second mast 13b. As a result, the assembly process described below becomes possible.

Prepare the first lower frame 25a and the second lower frame 25b.

Produce the unit by assembling the various mechanisms onto the connecting plates 29 of the first lower frame 25a and the second lower frame 25b.

Transport the above-described unit and the masts to the site and assemble both on site. That is, because only the work of assembling the masts is performed onsite, working efficiency improves.

Other Preferred Embodiments

The description above explained preferred embodiments of the present invention, but the present invention is not limited to the above-described preferred embodiments, and it is understood that various modifications may be effected without departing from the spirit of the present invention. In particular, the preferred embodiments and modified examples description in the present specification can be combined arbitrarily as needed.

Various preferred embodiments of the present invention can be widely adapted to stacker cranes including a mast and a lower travelling vehicle.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A stacker crane for travelling along a rail, comprising:
a lower travelling vehicle main body;
a first mast and a second mast extending in a vertical direction, the first mast and the second mast being provided in the lower travelling vehicle main body such that the first mast and the second mast are spaced away from each other in a travelling direction;
a first travelling wheel and a second travelling wheel configured to roll on a top surface of the rail, the first travelling wheel and the second travelling wheel being provided in the travelling vehicle main body such that the first travelling wheel and the second travelling wheel are spaced away from each other in the travelling direction;
a first drive wheel unit and a second drive wheel unit provided in the lower travelling vehicle main body such that the first drive wheel unit and the second drive wheel unit are spaced away from each other in the travelling direction; and
first connecting plates and second connecting plates each including a lower portion that is wider than an upper portion of the respective connecting plate; wherein
the first connecting plates are located on both sides of the first mast, extend outward of the first mast in the travelling direction, and support the first travelling wheel;
the second connecting plates are located on both sides of the second mast, extend outward of the second mast in the travelling direction, and support the second travelling wheel;
the first drive wheel unit includes:
a first driving wheel configured to contact a first side surface of the rail; and
a second driving wheel attached to the lower travelling vehicle main body such that the second driving wheel is pivotable and the second driving wheel is urged toward the first driving wheel to contact a second side surface of the rail; and
the second drive wheel unit includes:
a third driving wheel configured to contact the first side surface of the rail; and
a fourth driving wheel attached to the lower travelling vehicle main body such that the fourth driving wheel is pivotable and the fourth driving wheel is urged toward the third driving wheel to contact the second side surface of the rail.

2. The stacker crane according to claim 1, wherein
the first travelling wheel and the second travelling wheel are respectively located outward of the first mast and the second mast in the travelling direction; and
the first drive wheel unit and the second drive wheel unit are respectively located outward of the first travelling wheel and the second travelling wheel in the travelling direction.

3. The stacker crane according to claim 2, wherein the second driving wheel of the first drive wheel unit and the fourth driving wheel of the second driving wheel unit are located on a same side of the rail in a crossing direction crossing the travelling direction.

4. The stacker crane according to claim 3, wherein
the first drive wheel unit further includes:
a first travelling drive motor configured to drive the first driving wheel; and
a second travelling drive motor configured to drive the second driving wheel; and
the second drive wheel unit further includes:
a third travelling drive motor configured to drive the third driving wheel; and
a fourth travelling drive motor configured to drive the fourth driving wheel.

5. The stacker crane according to claim 2, wherein
the first drive wheel unit further includes:
a first travelling drive motor configured to drive the first driving wheel; and
a second travelling drive motor configured to drive the second driving wheel; and
the second drive wheel unit further includes:
a third travelling drive motor configured to drive the third driving wheel; and
a fourth travelling drive motor configured to drive the fourth driving wheel.

6. The stacker crane according to claim 1, wherein the second driving wheel of the first drive wheel unit and the fourth driving wheel of the second drive wheel unit are located on a same side of the rail in a crossing direction crossing the travelling direction.

7. The stacker crane according to claim 6, wherein
the first drive wheel unit further includes:
a first travelling drive motor configured to drive the first driving wheel; and
a second travelling drive motor configured to drive the second driving wheel; and
the second drive wheel unit further includes:
a third travelling drive motor configured to drive the third driving wheel; and
a fourth travelling drive motor configured to drive the fourth driving wheel.

8. The stacker crane according to claim 1, wherein
the first drive wheel unit further includes:
a first travelling drive motor configured to drive the first driving wheel; and
a second travelling drive motor configured to drive the second driving wheel; and
the second drive wheel unit further includes:
a third travelling drive motor configured to drive the third driving wheel; and
a fourth travelling drive motor configured to drive the fourth driving wheel.

9. The stacker crane according to claim 1, wherein
the first driving wheel and the second driving wheel are located outward of the first connecting plates in the travelling direction; and
the third driving wheel and the fourth driving wheel are located outward of the second connecting plates in the travelling direction.

* * * * *

UNITED STATES PATENT AND TRADEMARK OFFICE
CERTIFICATE OF CORRECTION

| | | |
|---|---|---|
| PATENT NO. | : 9,802,801 B2 | |
| APPLICATION NO. | : 14/424132 | |
| DATED | : October 31, 2017 | |
| INVENTOR(S) | : Yoichiro Koyama | |

It is certified that error appears in the above-identified patent and that said Letters Patent is hereby corrected as shown below:

On the Title Page

The Inventor in item (72) should read as follows:
--Yoichiro Koyama, Inuyama-shi (JP)--

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*